(12) United States Patent
Wright et al.

(10) Patent No.: US 11,176,071 B2
(45) Date of Patent: Nov. 16, 2021

(54) USB SIGNAL SWITCH CIRCUITRY USING STANDARD USB HUB AND METHOD OF OPERATION THE SAME

(71) Applicant: Cypress Semiconductor Corporation, San Jose, CA (US)

(72) Inventors: David G. Wright, San Mateo, CA (US); Shopitham Ram, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/450,528

(22) Filed: Jun. 24, 2019

(65) Prior Publication Data

US 2020/0151129 A1 May 14, 2020

Related U.S. Application Data

(60) Provisional application No. 62/823,966, filed on Mar. 26, 2019, provisional application No. 62/758,252, filed on Nov. 9, 2018.

(51) Int. Cl.
*G06F 13/20* (2006.01)
*G06F 13/38* (2006.01)
(Continued)

(52) U.S. Cl.
CPC .......... *G06F 13/385* (2013.01); *G06F 1/3253* (2013.01); *G06F 1/3287* (2013.01);
(Continued)

(58) Field of Classification Search
CPC ...... G06F 13/00; G06F 13/385; G06F 1/3253; G06F 1/3287; G06F 13/4022
(Continued)

(56) References Cited

U.S. PATENT DOCUMENTS 10,162,788 B2 12/2018 Shetty et al.
2007/0255885 A1* 11/2007 Bohm ................ G06F 13/4022
710/316

(Continued)

FOREIGN PATENT DOCUMENTS

| CN | 208538125 U | 2/2019 |
| GN | 206294300 U | 6/2017 |
| GN | 108808398 A | 11/2018 |

OTHER PUBLICATIONS

Microchip, 4-Port SS/HS USB Type-C Controller Hub; 2018-2019 Microchip Technology Inc, 54 pages.
(Continued)

*Primary Examiner* — Thomas J. Cleary
*Assistant Examiner* — Kim T Huynh

(57) ABSTRACT

A universal serial bus (USB) apparatus that has a USB hub, a first switching unit including first end coupled to a USB peripheral port of a first device, a second switching unit including a second end coupled to the USB hub and the first switching unit and a first end configured to be coupled to a first USB device, and control circuitry operable to provide control signals to the first and second switching units, in which the first control signals cause the first and second switching units to provide connectivity between the USB peripheral port of the first device and the first USB device when the first USB device is operating as a USB host and the second control signals to provide connectivity between the USB host port to the first USB device via the USB hub when the first USB device is operating as a USB peripheral.

22 Claims, 15 Drawing Sheets

(51) Int. Cl.
  *G06F 1/3234* (2019.01)
  *G06F 1/3287* (2019.01)
  *G06F 13/40* (2006.01)
(52) U.S. Cl.
  CPC .. *G06F 13/4022* (2013.01); *G06F 2213/0042* (2013.01); *G06F 2213/4002* (2013.01)
(58) Field of Classification Search
  USPC ................................ 710/315–316, 305, 100
  See application file for complete search history.

(56) References Cited

U.S. PATENT DOCUMENTS

| | | |
|---|---|---|
| 2011/0093641 A1 | 4/2011 | Yan |
| 2014/0218200 A1 | 8/2014 | Chen |
| 2015/0227485 A1* | 8/2015 | Maung ................ G06F 13/4022 710/316 |
| 2016/0232122 A1 | 8/2016 | Margabandu et al. |
| 2017/0010997 A1 | 1/2017 | Lin et al. |
| 2017/0270067 A1* | 9/2017 | Hu ........................ G06F 13/366 |
| 2017/0329733 A1 | 11/2017 | Lin et al. |
| 2018/0048753 A1* | 2/2018 | Chan ................. H04L 12/40078 |
| 2018/0060261 A1* | 3/2018 | Chhor ................ G06F 13/4282 |
| 2018/0314661 A1* | 11/2018 | Douthat ................ G06F 13/426 |
| 2018/0336154 A1 | 11/2018 | Ghosh et al. |
| 2019/0303331 A1* | 10/2019 | Yamada .................. G06F 13/20 |

OTHER PUBLICATIONS

International Search Report for International Application No. PCT/US19/51991 dated Jan. 31, 2020; 4 Pages.

Written Opinion of the International Searching Authority for International Application No. PCT/US19/51991 dated Jan. 31, 2020; 6 pages.

* cited by examiner

US 11,176,071 B2

USB SIGNAL SWITCH CIRCUITRY USING STANDARD USB HUB AND METHOD OF OPERATION THE SAME

PRIORITY

The present application claims the priority and benefit under 35 U.S.C. § 119(e) of U.S. Provisional Application No. 62/823,966, filed on Mar. 26, 2019, and U.S. Provisional Application No. 62/758,252, filed on Nov. 9, 2018, which are both incorporated by reference herein in their entirety.

TECHNICAL FIELD

The present disclosure relates generally to universal serial bus (USB) devices and systems. More particularly, it relates to USB signal path control and port switching embodiments using a standard USB hub and switch circuitry, and methods of operation thereof.

BACKGROUND

The USB standard is an easy-to-use universal interface for electronic devices, such as personal computer (PC), tablets, hubs, smartphones, etc., that has gained widespread acceptance. It is getting more prevalent to incorporate USB connections to automobile infotainment systems for power delivery purposes and interaction with mobile electronic devices, such as smartphones. In embodiments, the infotainment system may assume the role of a USB host while connecting to a mobile electronic device. In some embodiments, mobile electronic devices, such as an iPhone®, may assume a USB host role and controls at least an in-dash vehicle display portion of the infotainment system. Therefore, there are needs for a USB hub and switching logic circuit to allow an electronic system or device, such as an infotainment system, to connect to both USB peripheral device(s) and USB host device(s) concurrently.

BRIEF DESCRIPTION OF THE DRAWINGS

The present disclosure is illustrated by way of example, and not by way of limitation, in the FIGS. of the accompanying drawings.

DETAILED DESCRIPTION

Figure 1:
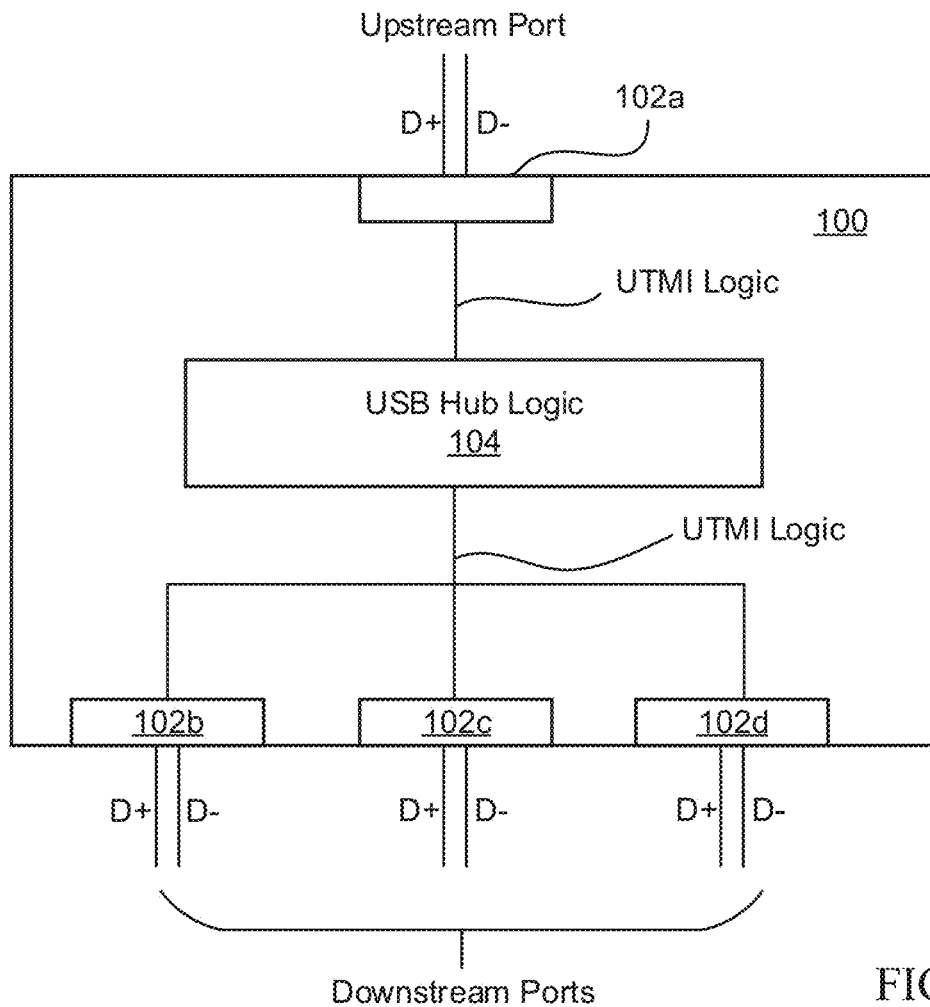
FIG. 1 is a schematic diagram illustrating a USB hub in accordance with one embodiment of the subject matter.

The following description sets forth numerous specific details such as examples of specific systems, components, methods, and so forth, in order to provide a good understanding of several embodiments of the subject matter. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the subject matter.

Unless specifically stated otherwise, as apparent from the following discussions, it is appreciated that throughout the specification discussions utilizing terms such as "generating", "detecting", "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

SUMMARY OF SUBJECT MATTER

The examples, implementations, and embodiments described herein may provide signal path switching and port swapping to USB apparatus and systems, and methods of operation thereof.

According to one embodiment, an USB apparatus of the subject matter may include a USB hub that has an upstream port coupling to a USB host port of a first device and a plurality of downstream ports, a first switching unit that has first and second ends, in which the first end is coupled to a USB peripheral port of the first device, a second switching unit that has a second end coupled to a first downstream port of the USB hub and the second end of the first switching unit. The second switching unit further has a first end configured to be coupled to a first USB device, and control circuitry operable to provide first control signals to the first and second switching units. In one embodiment, the first control signals may cause the first and second switching units to provide connectivity between the USB peripheral port of the first device and the first USB device when the first USB device is operating as a USB host. In one embodiment, it may also provide second control signals to at least the second switching unit, in which the second control signals may cause the second switching unit to provide connectivity between the USB host port to the first USB device via the first downstream port of the USB hub when the first USB device is operating as a USB peripheral.

In one embodiment, the aforementioned USB apparatus may also include a third switching unit that has a second end coupled to a second downstream port of the USB hub and the second end of the first switching unit, and a first end configured to be coupled to a second USB device.

In one embodiment, the control circuitry may be operable to provide third control signals to the first and third switching units, in which the third control signals may cause the first and third switching units to provide connectivity between the USB peripheral port of the first device and the second USB device when the second USB device is operating as a USB host. In another embodiment, the control circuitry may be operable to provide fourth control signals to at least the third switching unit, in which the fourth control signals may cause the third switching unit to provide connectivity between the USB host port of the first device to the second USB device via the second downstream port of the USB hub when the second USB device is operating as a USB peripheral.

In one embodiment, the control circuitry may have USB device functions and be coupled to a third downstream port of the USB hub. The control circuitry may be configured to receive USB signal commands from the first device through the USB host port and the USB hub.

In another embodiment, the control circuitry may be coupled to the first USB device through a serial interface.

In another embodiment, the control circuitry may be a part of the first device.

In one embodiment, the first and/or second and/or switching units are configured to multiplex USB D+/D− signals.

In one embodiment, each of the first, second, and third switching units may have a two input to two output (2×2) USB 2.0 switch.

In one embodiment, the USB peripheral port of the first device may be a USB On-The-Go (OTG) port and the first USB device may be an OTG device.

In one embodiment, the first USB device may be coupled to the first device through a USB Type-C receptacle.

According to one embodiment, a method of operation of a USB device/system of the subject matter may include the steps of coupling a USB peripheral port of a first device to a first USB device through a first switching unit and a second switching unit to establish a first signal path, coupling a USB host port of the first device to the first USB device through a USB hub and the second switching unit to establish a second signal path, disconnecting the USB hub and the first USB device, using the second switching unit, to deactivate the second signal path when the first USB device is operating as a USB host, and activating the first signal path, using the first and second switching units when the first USB device is operating as a USB host.

In one embodiment, the aforementioned method may also include the steps of coupling the USB peripheral port of the first device to a second USB device through the first and a third switching units to establish a third signal path, coupling the USB host port of the first device to the second USB device through the USB hub and the third switching unit to establish a fourth signal path, disconnecting the USB hub and the second USB device, using the third switching unit, to deactivate the fourth signal path when the second USB device is operating as a USB host, and activating the third signal path, using the first and third switching units when the second USB device is operating as a USB host.

In one embodiment, the second signal path and the third signal path may be configured to be activated concurrently when the first device is operating as a USB host to the first USB device and a USB peripheral to the second USB device.

In another embodiment, the first signal path and the fourth signal path may be configured to be activated concurrently when the first device is operating as a USB peripheral to the first USB device and a USB host to the second USB device.

In one embodiment, the aforementioned method may also include the steps of transmitting control signals, from control circuitry, to the first and second switching units, in which the control signals are configured to cause the second switching unit to disconnect the USB hub to the first USB device. The control signals may also cause the first and second switching units to connect the USB peripheral port of the first device to the first USB device, when the first USB device is operating as the USB host.

According to one embodiment, a USB system of the subject matter may include a head unit of an automobile infotainment system that may have a USB host port and a USB peripheral port, a USB hub that has an upstream port coupled to the USB host port, switching circuitry that is configured to switch and multiplex USB D+/D− signals, control circuitry that is configured to transmit control signals to the switching circuitry, and a vehicle center console including first and second USB Type-C ports. In one embodiment, when a first USB device is operating as a USB host and coupled to the first USB Type-C port, the control signals may be configured to cause the switching circuitry to disconnect the USB hub and the first USB device and to enable connection between the USB peripheral port and the first USB device.

In one embodiment, the first USB device may be an Apple® iPhone® that is CarPlay® enabled and the USB peripheral port of the head unit may be a USB On-The-Go (OTG) port.

In one embodiment, the switching circuitry may include first, second, and third signal repeaters, in which the first signal repeater may be coupled to the USB peripheral port and the second and third signal repeaters may each be coupled to one of downstream ports of the USB hub and the first signal repeater. In one embodiment, the first, second, and third signal repeaters may each include a two input to two output (2×2) USB 2.0 switch.

In another embodiment, the switching circuitry may have a two input to three output (3×2) USB 2.0 switch, in which USB D+/D− top signals and USB D+/− bottom signals coupled to the first USB type C port may be shorted to form a first D+/D− input, and USB D+/D− top signal and USB D+/D− bottom signal coupled to the second USB type C port may be shorted to form a second D+/D− input. In one embodiment, two D+/D− outputs of the 3×2 USB 2.0 switch may be coupled to the USB hub and the last one D+/D− output to the USB peripheral port of the head unit.

In one embodiment, when a second USB device is operating as a USB peripheral and coupled to the second USB Type-C port, the control signals may be configured to cause the switching circuitry to enable connection between the USB host port and the second USB device through the USB hub.

In another embodiment, when a second USB device is operating as a USB host and coupled to the second USB Type-C port, the control signals may be configured to cause the switch circuitry to enable connection between the USB peripheral port and the second USB device.

In one embodiment, the head unit may operate as a USB peripheral to the first USB device and a USB host to the second USB device, or vice versa, concurrently and individually.

FIG. 1 is a schematic diagram illustrating a USB hub in accordance with one embodiment of the subject matter. A USB hub is a device that expands a single USB port into several so that more ports are available to connect devices to a host system. In one embodiment, USB hub 100 may include USB hub logic 104, upstream universal transceiver macrocell interface (UTMI) transceiver 102a, and downstream UTMI transceivers 102b to 102d. USB hub logic 104 may be coupled to upstream UTMI transceiver 102a on an upstream end and coupled to multiple downstream UTMI transceivers 102b to 102d on a downstream end. In some embodiment, upstream UTMI transceiver 102a may be coupled to a hosting device/system via an upstream receptacle (not shown) and downstream UTMI transceivers 102b to 102d may be coupled to peripheral device(s) via downstream receptacles (not shown), respectively. In other embodiments, transceivers using logic level signals other than UTMI may be used. In one embodiment, a downstream port power management circuit (not shown) may also be coupled between USB hub logic 104 and downstream receptacles. It will be the understanding that the shown configuration of USB hub 100 in FIG. 1 and the numbers of upstream and downstream ports are for illustrative purposes, and not to be construed as limitations. Upstream and downstream UTMI transceivers 102a to 102d may provide a physical layer interface (PHY) between USB signaling on USB interfaces and logic signaling used inside USB hub logic 104. For example, upstream and downstream UTMI transceivers 102a to 102d may provide an interface between the D+ and D− USB signals from host or peripheral devices and the 8 or 16 bit UTMI logic signal buses connected to USB hub logic 104. The control and operation of USB hub 100 may be implemented using control logic, digital circuitry, analog circuitry, and a processor, microcontroller, state machine, or other execution unit. The instructions, when loaded into memory and executed by the processor, may cause or configure USB hub 100 to perform the functionality described herein. The processor, control logic, and circuitry may be included in USB hub logic 104. USB hub logic 104 may determine how USB communication is to be performed by USB hub 100.

In general, a standard USB hub, such as USB hub 100, may be configured to allow multiple USB peripheral devices (via downstream ports) to be coupled and controlled by a single host device/system (via an upstream port). With continual upgrades and improvements, many USB devices, such as mobile phones, tablets, digital audio players, cameras, etc., may act as a host or a peripheral device in different occasions. A standard USB hub, such as USB hub 100, however may not support such reversal or swapping of host/peripheral roles in its configuration.

Figure 2:
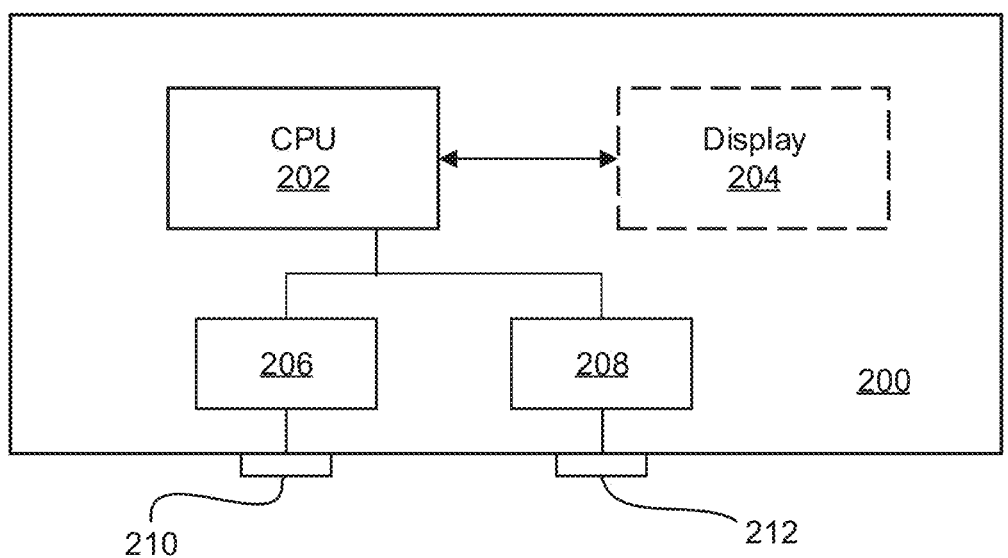
FIG. 2 is a schematic diagram illustrating a USB system in accordance with one embodiment of the subject matter.

FIG. 2 is a schematic diagram illustrating an electronic system that supports the USB standards, such as USB 2.0, USB 3.0, USB 3.1, USB Type-C, and USB On-The-Go (OTG). In one embodiment, the electronic system in FIG. 2 may be a head unit 200 of an infotainment system in an automobile. Head unit 200 may include a CPU 202 coupled to USB host control logic 206 and USB peripheral control logic 208. USB host control logic 206 is further coupled to USB host port 210 and USB peripheral control logic 208 to USB peripheral port 212. In one embodiment, head unit 200 may act as a USB host when being coupled to a peripheral device (such as an MP3 player) via USB host port 210. In one embodiment, USB host control logic 206 may control data link wherein data is broadcasted to and received from connected USB peripheral device(s). In another embodiment, head unit 200 may act as a USB peripheral device when being coupled to a device that has the capabilities of serving as a USB host via USB peripheral port 212. For example, head unit 200 may be coupled to a smart phone (not shown), in which the smart phone may control an in-dash vehicle display, such as display 204 of head unit 200. USB peripheral control logic 208 may provide control of data received and transmitted to the smart phone via USB peripheral port 212. In one embodiment, head unit 200 may assume the role of a USB host device and a USB peripheral device concurrently, and each of the USB host and peripheral operation may be executed individually. It will be the understanding that head unit 200 is only one example of the electronic system illustrated in FIG. 2. The electronic system in FIG. 2 may be any device or system, such as a personal computer, a monitor, a smart phone, that has the capabilities and needs to be a USB host and a USB peripheral device concurrently, such as a USB OTG device.

Figure 3:
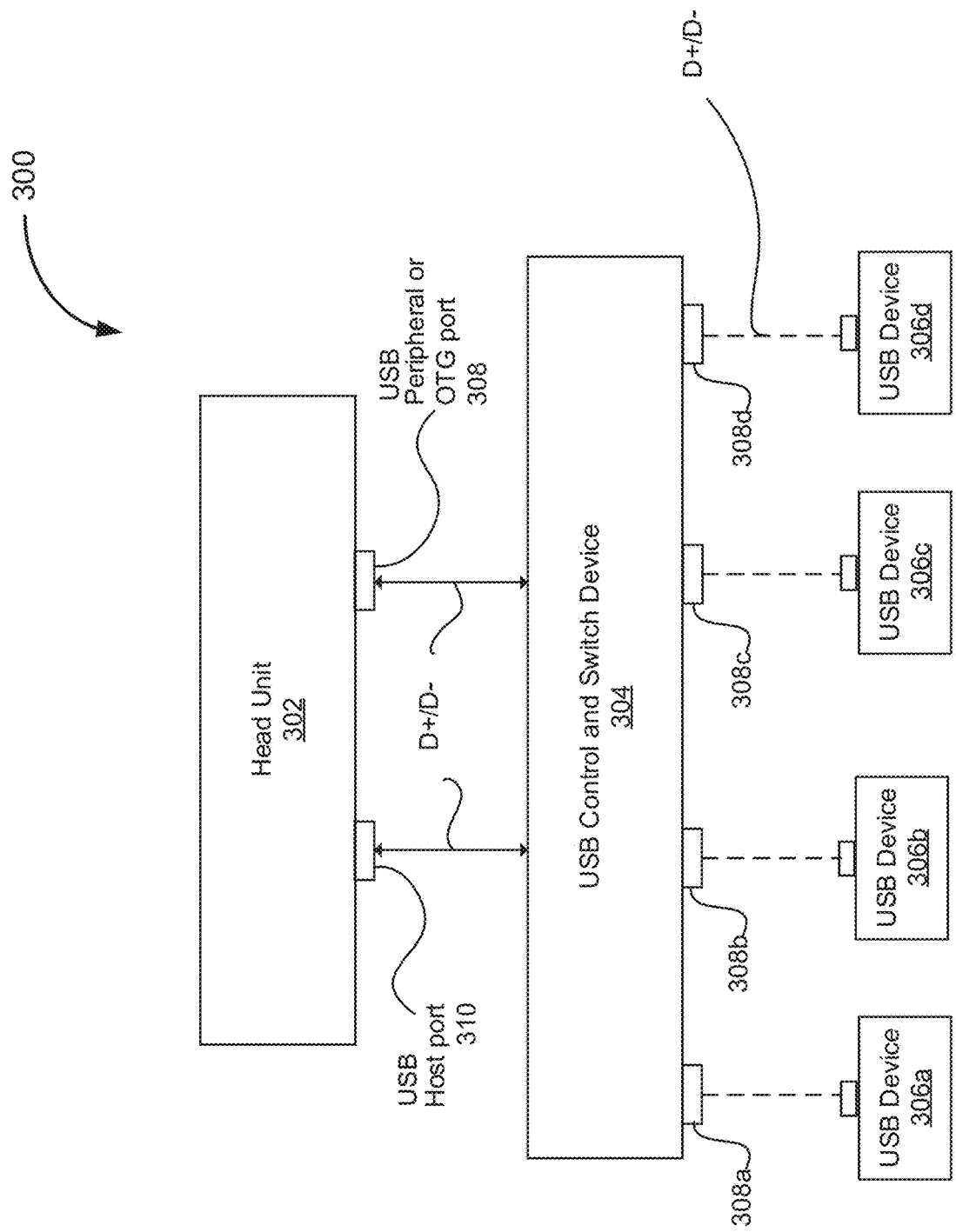
FIG. 3 is a schematic diagram illustrating a USB system in accordance with one embodiment of the subject matter.

FIG. 3 is a schematic diagram illustrating a USB system in accordance with one embodiment of the subject matter. In one embodiment, USB system 300 may include head unit 302 of an automobile that is similar to head unit 200 in FIG. 2. Head unit 302 may have USB host port 310 and USB peripheral port 308, which are separated from one another. In one embodiment, USB peripheral port 308 may be, additionally or alternatively, a USB OTG port. The USB OTG Specification enables USB peripheral devices to assume the role of a USB host as required and hence be able to take more control of the USB data flow, but the OTG model requires that the default host, such as head unit 302, change to a USB peripheral role concurrently as the device changing to the USB host role. In one embodiment, head unit 302 is coupled to several USB devices 306a to 306d via USB control and switch device 304. USB control and switch device 304 may have USB Type-C receptacles 308a to 308d for coupling to USB devices 306a to 306d, respectively. In other embodiments, one or more of receptacles 308a to 308d may be USB Type-A receptacles, or other types of USB receptacles. USB devices 306a to 306d may be a USB host device or a USB peripheral device or an USB OTG device. As an example, USB device 306a may be a USB peripheral device. In one embodiment, USB control and switch device 304 may provide active signal path or communication link between head unit 302 and USB device 306a via USB host port 310. In this particular instance, USB control and switch device 304 may perform like a standard USB hub, such as USB hub 100 in FIG. 1. In another embodiment, USB device 306b may be a USB host device coupled to USB control and switch device 304 via receptacle 308b. In this instance, USB control and switch device 304 may provide active signal path or communication link between head unit 302 and USB device 306b via USB peripheral port 308, such that USB device 306b may assume control over one or more aspects of head unit 302 functionality and the established signal path. In one embodiment, USB control and switch device 304 may provide appropriate active signal paths to the connected USB devices 306a to 306d, according to the USB role (host or peripheral) they assume. In another embodiment, USB control and switch device 304 may have the abilities to provide signal path switching functions when a connected USB device, such as USB device 306a switching its role from a peripheral device to a host device, and vice versa. Details of USB control and switch device 304 are discussed below.

Figures 4A, 4B, 4C:
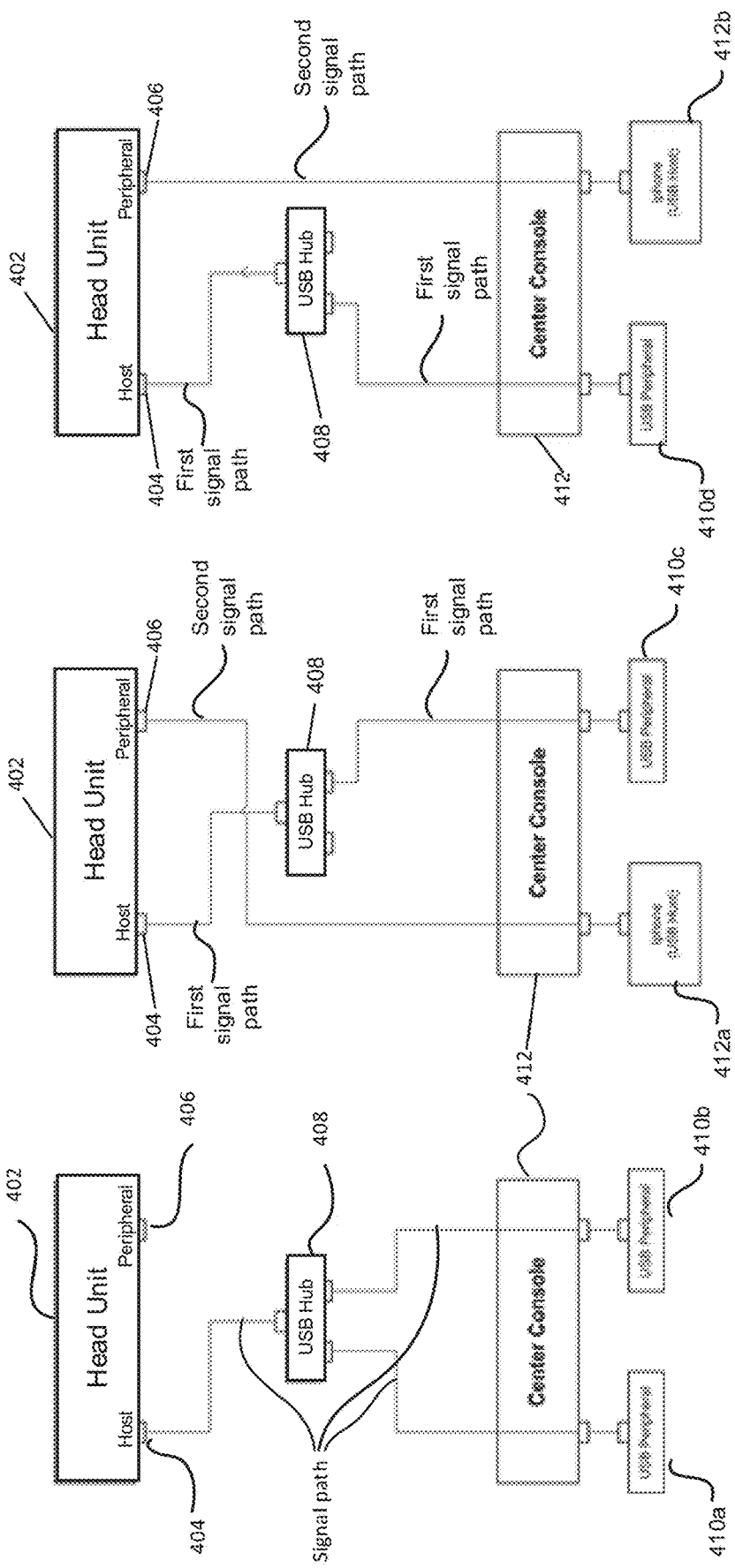
FIGS. 4A-4C are schematic diagrams illustrating a USB system and signal paths to USB host and peripheral devices in accordance with embodiments of the subject matter.

FIGS. 4A to 4C are representative block diagrams illustrating signal path switching using a USB hub according to one embodiment of the subject matter. Referring to FIG. 4A, infotainment head unit 402 may have USB host port 404 and USB peripheral port 406. In one embodiment, USB peripheral port 406 may support USB OTG standards. Vehicle center console 412 may have several receptacles for coupling to USB devices. In embodiments, receptacles may be USB Type-C or other types of USB receptacles. When USB peripheral devices 410a and 410b are coupled to USB ports or receptacles in vehicle center console 412, head unit 402 may assume the role of a USB host and an active signal path is established between USB host port 404 and the upstream port of USB hub 408. USB hub 408 may then be coupled to USB peripheral devices 410a and 410b via its downstream ports and USB receptacles in vehicle center console 412. It will be understood that only two downstream ports and USB devices are shown in FIGS. 4A and 4C for illustrative purposes only. The numbers of downstream ports, receptacles, and USB devices may change according to system and usage requirements without departing from the broader spirit and scope of the disclosure.

Referring to FIG. 4B, USB host device 412a is coupled to the left receptacle of vehicle center console 412 and USB peripheral device 410c to the right receptacle. In one embodiment, USB host device 412a may be a smart phone, such as an Apple iPhone®, or a device having USB host capabilities, or a USB OTG device. In one embodiment, a first signal path may be established between USB host port 404 of head unit 402 via USB hub 408. Head unit 402 is the USB host of the communication link to USB peripheral device 410c. Concurrently, a second signal path may be established between head unit 402 and USB host device 412a. In one embodiment, the second signal path is a point-to-point link bypassing USB hub 408 and the communication link is controlled by USB host device 412a. In one embodiment, there are two hosts in the system in FIG. 4B, one being included in head unit 402 controlling the first signal path to USB peripheral device 410c via USB hub 408. The other host is USB host device 412a controlling the second signal path to USB peripheral port 406 of head unit 402. In the embodiment that USB host device 412a is a USB OTG device, USB peripheral port 406 may also be an OTG port, an additional signal path (not shown) that is known in the art may be present to enable and support OTG role swapping between head unit 402 and USB host device 412a.

Referring to FIG. 4C, USB peripheral device 410d is coupled to the left receptacle and USB host device 412b or a USB OTG device is coupled to the right receptacle. In one embodiment, similar to the embodiment in FIG. 4B, a point-to-point signal path bypassing USB hub 408 may be established between USB peripheral/OTG port 406 of head unit 402 and USB host device 412b. A host signal path may be established between USB host port 404 and USB peripheral device 410d via USB hub 408. In one embodiment, both signal paths may be operational uninterrupted concurrently and individually, and head unit 402 may assume the roles of a USB host and a USB peripheral at the same time.

As illustrated in FIGS. 4A to 4C, for a USB system having a standard USB hub to operate as described, it may require dedicated USB peripheral and host ports at vehicle center console 412, or unplugging of USB cables. In another embodiment, it may require rearrangement of signal paths to accommodate all three embodiments in FIGS. 4A to 4C.

Figure 5A:
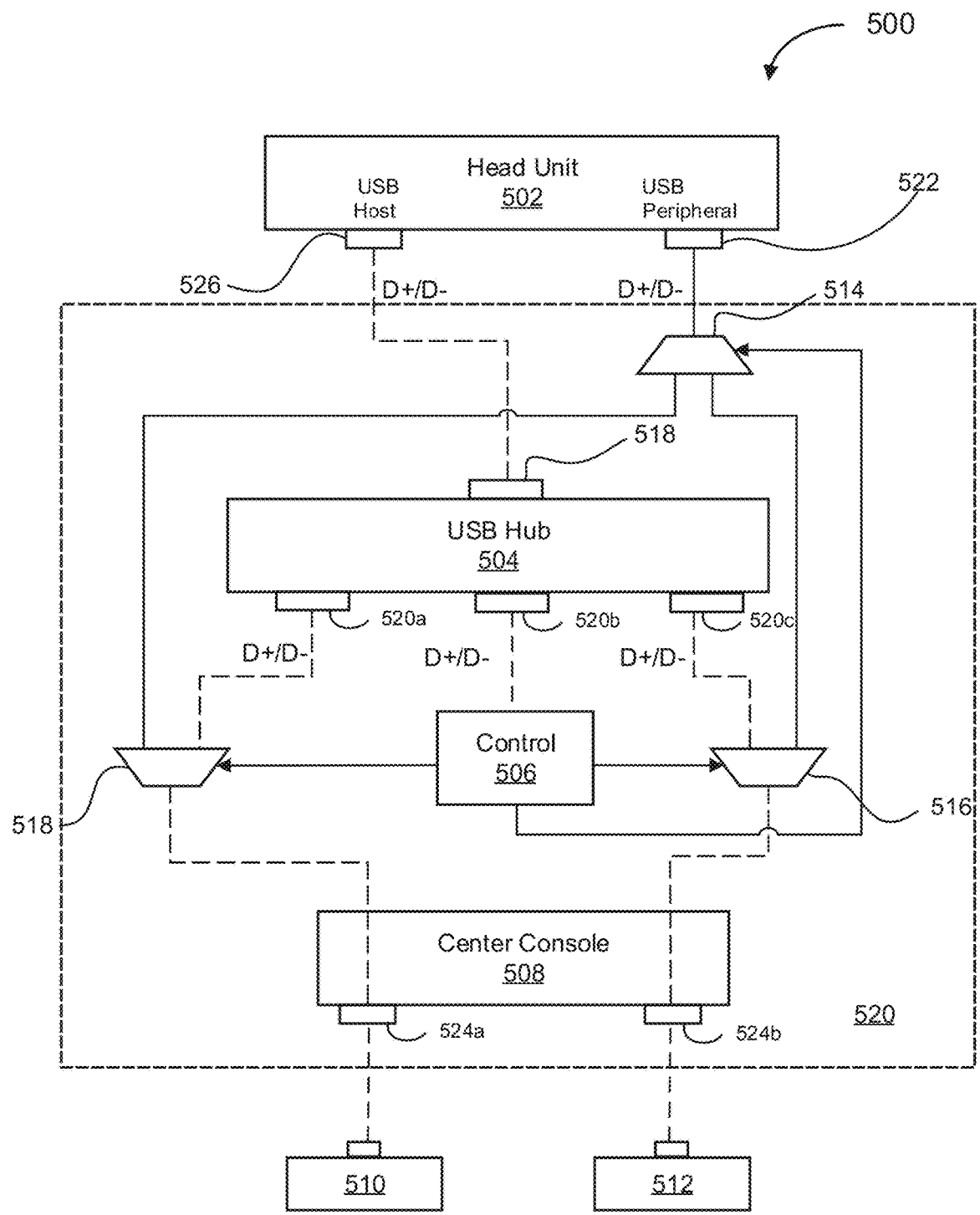
FIGS. 5A-5E are schematic diagrams illustrating a USB system having a USB hub and corresponding switch circuit in accordance with embodiments of the subject matter.
Figure 5B:
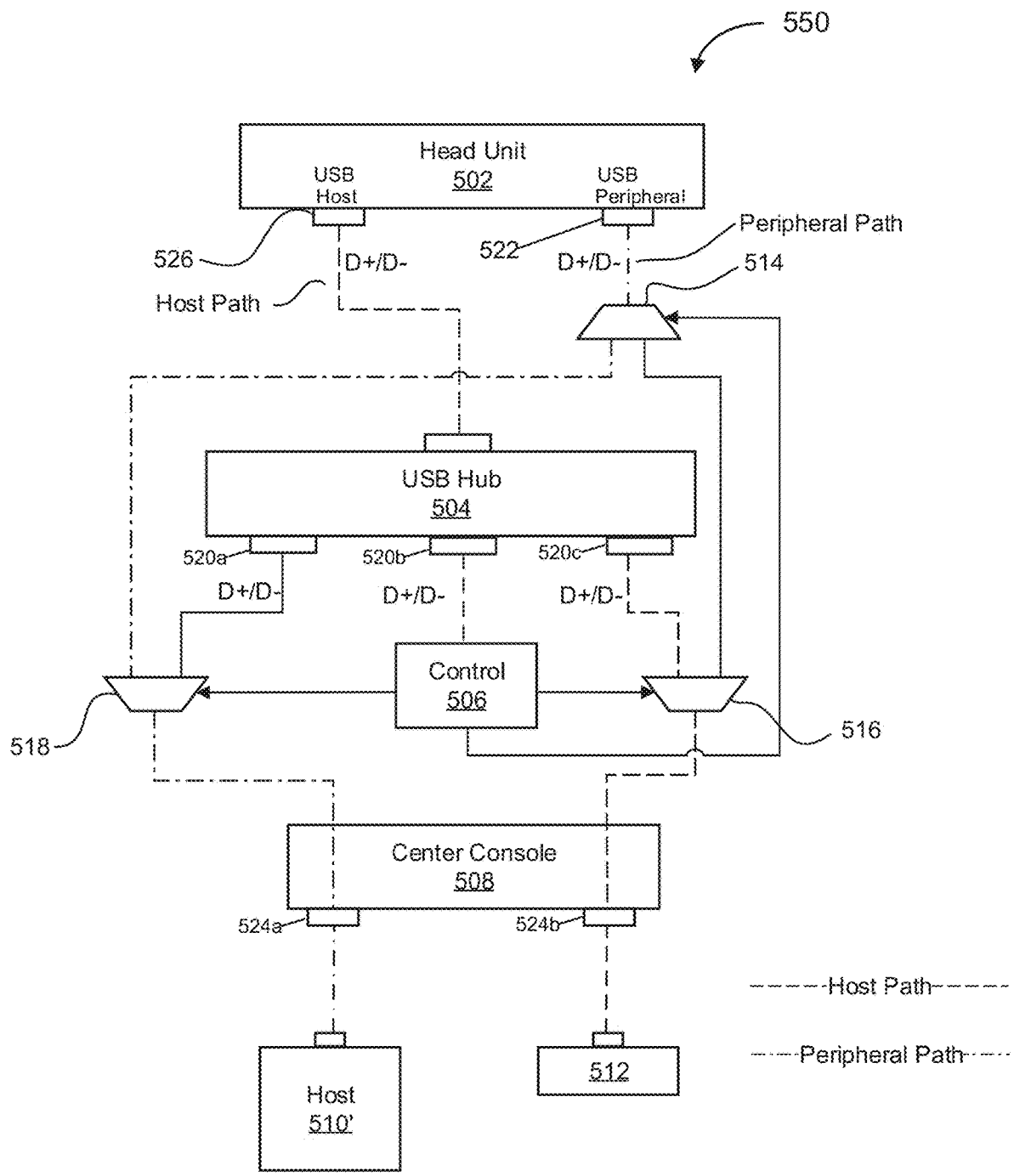
Figure 5C:
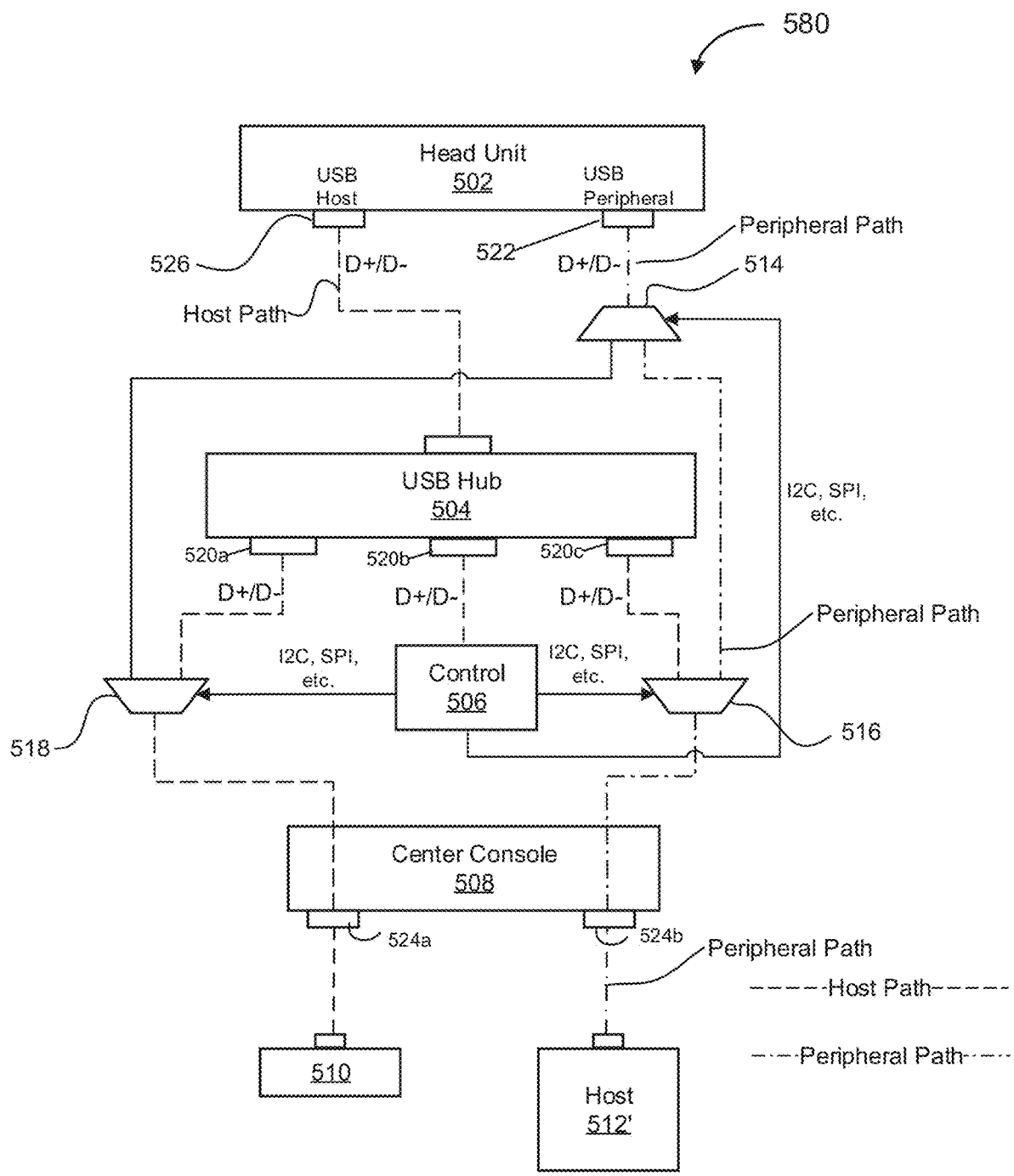

FIGS. 5A to 5C are representative block diagrams illustrating USB systems according to embodiments of the subject matter. Referring to FIG. 5A, head unit 502 may be a part of an in-vehicle infotainment system or a device having both USB host and peripheral capabilities and compatibilities. In one embodiment, head unit 502 may have separate USB host port 526 and USB peripheral port 522, which may additionally or alternatively be an OTG port. Head unit 502 may be coupled to USB hub 504 and switching circuit 520 that may perform similar functions to USB control and switch device 304 in FIG. 3. In one embodiment, USB hub and switching circuit 520 may include USB hub 504 having upstream port 518 and downstream ports 520a to 520c. USB hub 504 may be a standard USB hub having similar structural features and functions as USB hub 100 in FIG. 1, or other embodiments practiced in the art. In one embodiment, upstream port 518 and downstream ports 520a to 520c provide a physical layer interface between USB D+/D− signaling to UTMI (or other analogous) signaling inside USB hub 504. In one embodiment, USB host port 526 of head unit 502 is coupled to upstream port 518 of USB hub for USB D+/D− signal transmission. Downstream port 520a is coupled to the multiple input/output end of first switching unit or signal repeater or multiplexer (hereinafter "signal repeater") 518 while downstream port 520c is coupled to the multiple input/output end of second signal repeater 516. USB peripheral port 522 of head unit 502 is coupled to the single input/output end of third signal repeater 514. Third signal repeater 514 is then coupled to the multiple input/output end of each of first and second signal repeater at their respective multiple input/output end. In one embodiment, first, second, and third signal repeaters 518, 516, and 514 may have similar structural features, and they may be multiplexers, passive Double-Pole-Double-Throw (DPDT) switches, active D+/D− signal repeaters, or a combination thereof. The primary function of first, second, and third signal repeaters 518, 516, and 514 is to switch, multiplex, and/or repeat input/output signal to/from one of the multiple signal paths as configured by control signals by multiplexing or switching the USB D+/D− signals. In embodiments, first, second, and third signal repeaters 518, 516, and 514 may be 1×2 USB 2.0 switches or 2×2 USB 2.0 switches for Type-C connection, which will be discussed in detail below. In one embodiment, control circuit 506 is coupled to downstream port 520*b* and transmits control signals to each of first, second, and third signal repeaters 518, 516, and 514 to configure active signal path(s). Control circuit 506 may be a USB device, including a USB peripheral controller function, receiving USB commands from head unit 502 through USB host port 526 and USB hub 504. Single input/output ends of first and second signal repeaters 518 and 516 are coupled to receptacles situated in vehicle center console 508. Vehicle center console 508 may include USB receptables 524*a* and 524*b* for coupling to USB device(s) 510 and/or 512. In embodiments, USB receptacles 524*a* and 524*b* may be USB Type-C receptacles, USB Type-A receptacles, or other USB type receptacles.

Referring to FIG. 5A, USB devices 510 and 512 may be coupled to receptacles situated in vehicle center console 508. In one embodiment, USB devices 510 and 512 may be both USB peripheral devices. Head unit 502 may start enumeration process and identify both USB devices 510 and 512 are USB peripheral devices, and may assume the USB host role. USB commands may be sent from head unit 502 to control circuit 506 through USB hub 504 and downstream port 520*b*, which in response may then send control signals respectively to first, second, or third signal repeaters 518, 516, or 514. In one embodiment, USB peripheral port 522 may be deactivated or disconnected. Additionally or alternatively, third signal repeater 514 may be deactivated by the control signal such that there is no active signal path from/to USB peripheral port 522. First and second signal repeaters 518 and 516 may be configured, by control signals, to switch or repeat or multiplex USB D+/D− signals to and from downstream ports 520*a* and 520*c*, respectively. As a result, two respective active signal paths, as indicated in dotted lines in FIG. 5A, are established between USB host port 526, and USB devices 510 and 512. In one embodiment, head unit 502 may assume the USB host role and control the established communication links and/or USB devices 510 and 512. In one alternative embodiment, only one USB device 510 or 512 is connected to a receptacle situated in vehicle center console 508. Control circuit 506 may deactivate second or first signal repeater 516 or 518. In one embodiment, signal repeaters 514, 516, and 518 may support multiplexing/repeating LS, FS, HS, and SS USB D+/D− signals up to at least 480 MHz speed while meeting the demanding timing and matching requirements of the USB specifications. It will be understood that only two active signal paths (to/from USB devices 510 and 512) are included for simplicity, and should not be construed as limitations. Embodiments with more than two ports/receptacles in vehicle center console 508 will be discussed below.

In one embodiment, first, second, and third signal repeaters 518, 516, and 514, and control circuit 506 may be integrated into a single integrated circuit (IC), and mounted on a circuit board along with USB hub 504 IC in vehicle center console 508 of the vehicle, or elsewhere in the vehicle (not shown). One USB cable may connect upstream port 518 of USB hub 504 to head unit 502 which may be in the dash board. Another USB cable may connect the single IC to peripheral/OTG port 522 of the head unit 502. In one embodiment, these two USB cables may share a single insulating sleeve, and thus physically appear to be a single cable. Within the shared sleeve, there may be two sets of conductors, each with its own shield, though in some embodiments the two sets of conductors may share power and/or ground conductors. Receptacles 524*a* and 524*b* may be USB Type-C receptacles. USB Type-C, is defined in various releases and/or versions of the USB Type-C specification (e.g., such as Release 1.0 dated Aug. 11, 2014, Release 1.1 dated Apr. 3, 2015, etc). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Referring to FIG. 5B, a similar USB system 550 to USB system 500 is featured. In one embodiment, USB host device 510' and USB peripheral device 512 may be coupled to receptacles 524*a* and 524*b* situated in vehicle center console 508, respectively. During the USB enumeration process, USB host port 526 in head unit 502 may identify the device (USB host device 510') coupled to USB receptacle 524*a* as being capable of USB host operation. In one embodiment, head unit 502 may send USB command signals through USB host port 526 to control circuit 506 via USB hub 504. In turn, control circuit 506 may send a control signal to signal repeater 514 such that a (peripheral) signal path is established between USB peripheral port 522 to the multiple input/output end of first signal repeater 518. Control circuit 506 may also send another control signal to first signal repeater 518 such that only the USB signal to/from peripheral port 522 is repeated. As a result, there is a point-to-point signal path established between head unit 502 and USB host device 510', by-passing USB hub 504. In this instance, USB host device 510' may take control of the active signal path established and thus exercise control over certain functions of head unit 502, such as controlling information display an in-dash vehicle display unit.

In one particular embodiment, USB host device 510 may be a smartphone or tablet computer, more particularly an Apple® iPhone® or iPad® (hereinafter "Apple product") that is CarPlay® enabled. In one alternative embodiment, USB host device 510 may be an Android® phone that is AndroidAuto® enabled. CarPlay® is an Apple® proprietary standard that enables a car head unit to be a display and also act as a controller for an iOS device or other USB peripheral devices. CarPlay® standard requires a USB system that operates in certain ways resembling a standard USB hub, but must also support one or multiple downstream USB ports that can "reverse direction" and become a USB host port, while the other downstream ports remain connected to the head unit as the USB host. Referring to FIG. 5B, when the Apple product is initially coupled to receptacle 524a, it may behave as a USB peripheral, and connects to USB host port 526 of head unit 502 via USB hub 504. When head unit 502 detects that an Apple product is connected, it may offer the user an option to enable CarPlay® application. The Apple product may continue to assume the role of a peripheral device if the user chooses not to activate the CarPlay® mode. In one alternative embodiment, the enabling of Car-Play® may be automatic and triggered by the coupling. In response to data exchanged between head unit 502 and the Apple product while it is in peripheral mode, CarPlay® mode may be initiated, and similar to the above description, head unit 502 may send USB command signals through USB host port 526 to control circuit 506 via USB hub 504. In turn, control circuit 506 may send control signals to third and first signal repeaters 514 and 518 such that a point-to-point signal path is established between peripheral port 522 to the Apple product via third and first signal repeaters 514 and 518, and receptacle 524a in vehicle center console 508. In one embodiment, the Apple product may act as a USB host and take control of the active signal path established and thus exercise control over certain functions of head unit 502, such as controlling information display an in-dash vehicle display unit. Although USB peripheral port 522 may also be a USB OTG port, as there may not be any OTG support provided by USB hub 504, non-standard approaches, such as by-passing USB hub 504, may be required to allow the Apple product to switch from peripheral mode to host mode. In one embodiment, the Apple product may then become a USB host, and enumerate head unit 502 as a USB peripheral via USB peripheral port 522. Concurrently, USB peripheral device 512 may also be coupled to receptacle 524b situated in vehicle center console 508. In one embodiment, head unit 502 may send USB command signals to control circuit 506, which may in turn send control signals to second signal repeater 516 to select or switch to USB D+/D− signal conductors from USB hub 504, and not from third signal repeater 514. As a result, a host signal path may be established between head unit 502 and USB peripheral device 512 via USB host port 526, USB hub 504, downstream port 520c, and receptacle 524b in vehicle center console 508, resembling standard USB hub operation. In one embodiment, even when the CarPlay® mode is on via USB peripheral port 522, USB peripheral device 512 and any other USB device(s) connected to another downstream USB port of the system (not shown in FIG. 5B) may continue uninterrupted USB peripheral operation through USB host port 526.

Referring to FIG. 5C, USB peripheral device 510 is coupled to receptacle 524a and USB host device 512' to receptacle 524b. In one embodiment, USB host device 512' may be an Apple product. Operation of USB system 580 may be similar to USB system 550 in FIG. 5B. In one embodiment, head unit 502 may send USB command signals to control circuit 506, which in turn may send control signals to first, second, and third signal repeaters 518, 516, and 514. Host signal path may be established between head unit 502 and USB peripheral device 510 through USB host port 526, USB hub 504, downstream port 520a, and first signal repeater 518, in which head unit 502 acts as a USB host. Concurrently and individually, peripheral signal path may be established between USB peripheral/OTG port 522 of head unit 502 and the Apple product 512' after the CarPlay® mode is enabled through third signal repeater 514, and second signal repeater 516, in which the Apple product 512' acts as a USB host and head unit 502 a USB peripheral. In one embodiment, there may be two USB hosts, head unit 502 (to host signal path and USB device 510) and the Apple product or USB host device 512' (to peripheral signal path and head unit 502) in USB system 580.

In one alternative embodiment (not shown), when head unit 502 detects both receptacles 524a and 524b are coupled to Apple products or USB host devices, head unit 502 may select one of the USB host devices for CarPlay® mode operation, or may offer the user an opportunity to select which USB host device is to be operated in CarPlay® mode.

Referring to FIGS. 5A to 5C, in various embodiments, each of receptacles 524a and 524b (or additional ports/receptacles) may be coupled to either a USB peripheral device, a USB host device, a USB OTG device, or any iPhone® in CarPlay® mode. Head unit 502 and control circuit 506 may generate appropriate control signals to signal repeaters to establish either a host signal path to USB host port 526 or a peripheral signal path to USB peripheral/OTG port 522.

Figure 5D:
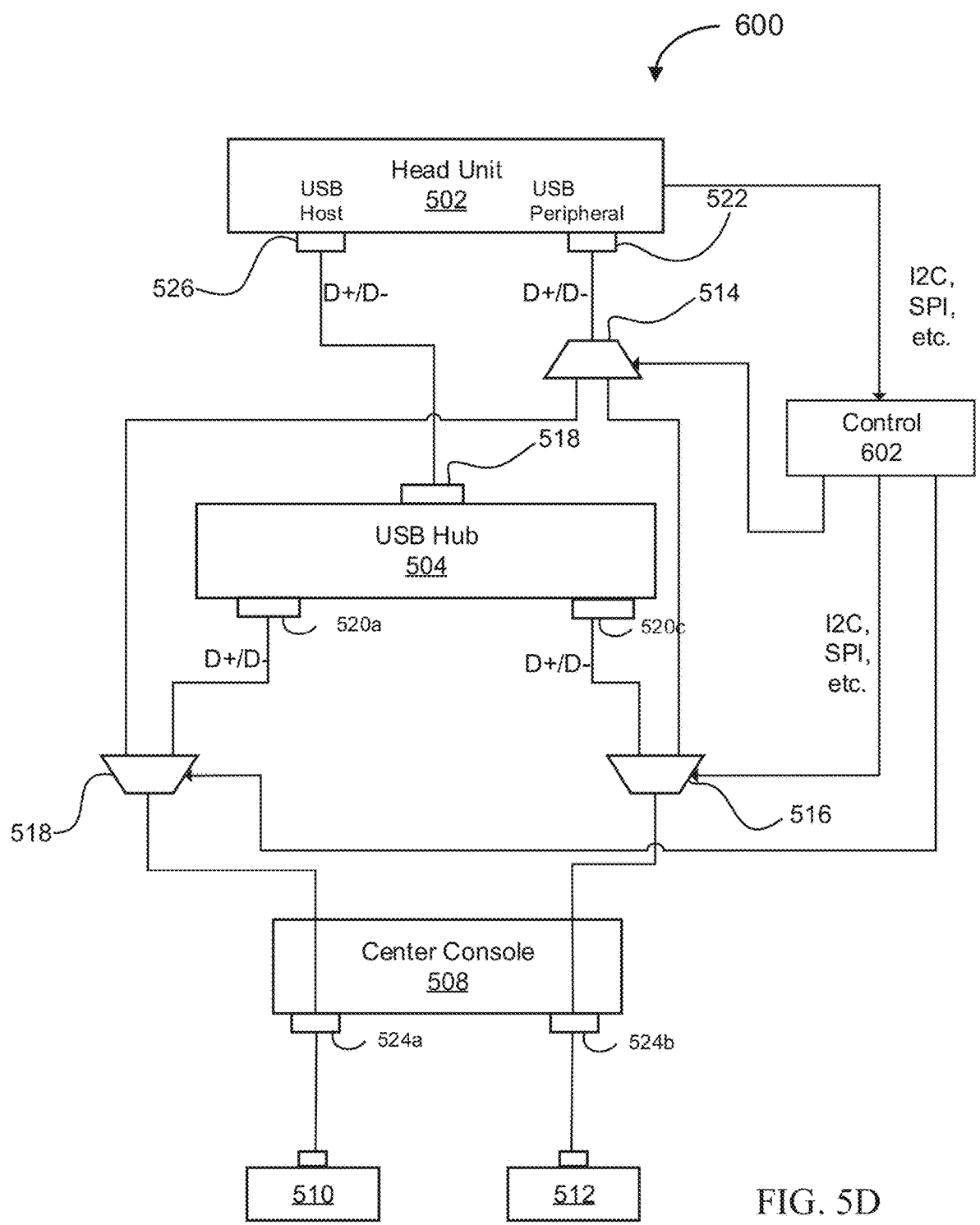

Referring to FIG. 5D, an alternative USB system 600 that is similar to USB system 500 in FIG. 5A is illustrated. In one embodiment, control circuit 602 may not be a USB device and is not coupled to any downstream port of USB hub 504. In one embodiment, head unit 502 generates and sends commands directly to control circuit 602 using a serial interface including but not limited to I2C or SPI, and control circuit 602 may in turn send control signals to first, second, third signal repeaters 518, 516, and 514 to effect signal path switching and control functions as described in FIGS. 5A to 5C.

Figure 5E:
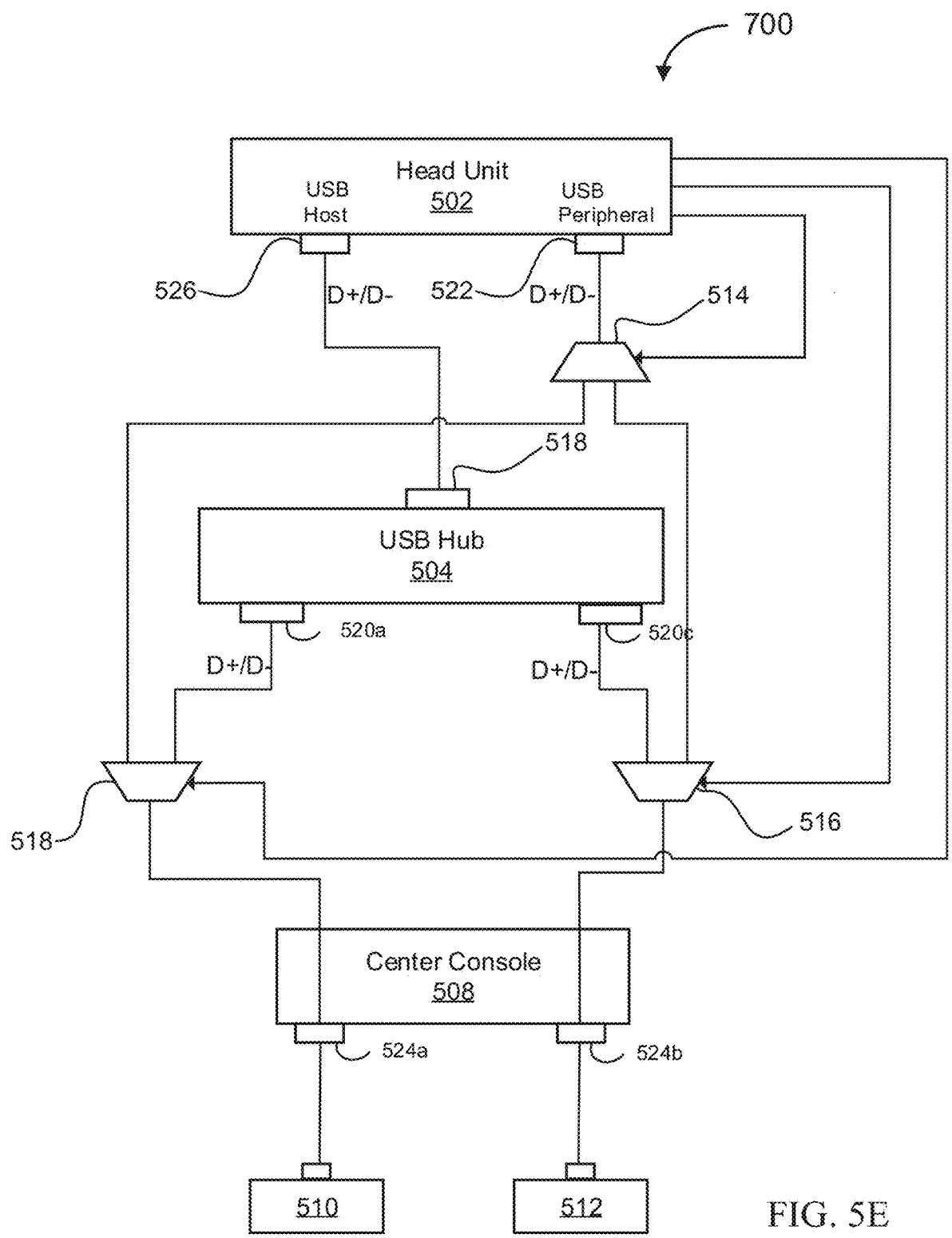

Referring to FIG. 5E, another alternative USB system 700 is featured. In one embodiment, control signals are generated and sent directly from head unit 502 to first, second, third signal repeaters 518, 516, and 514 to effect signal path switching and control functions as described in FIGS. 5A to 5C.

Figure 6:
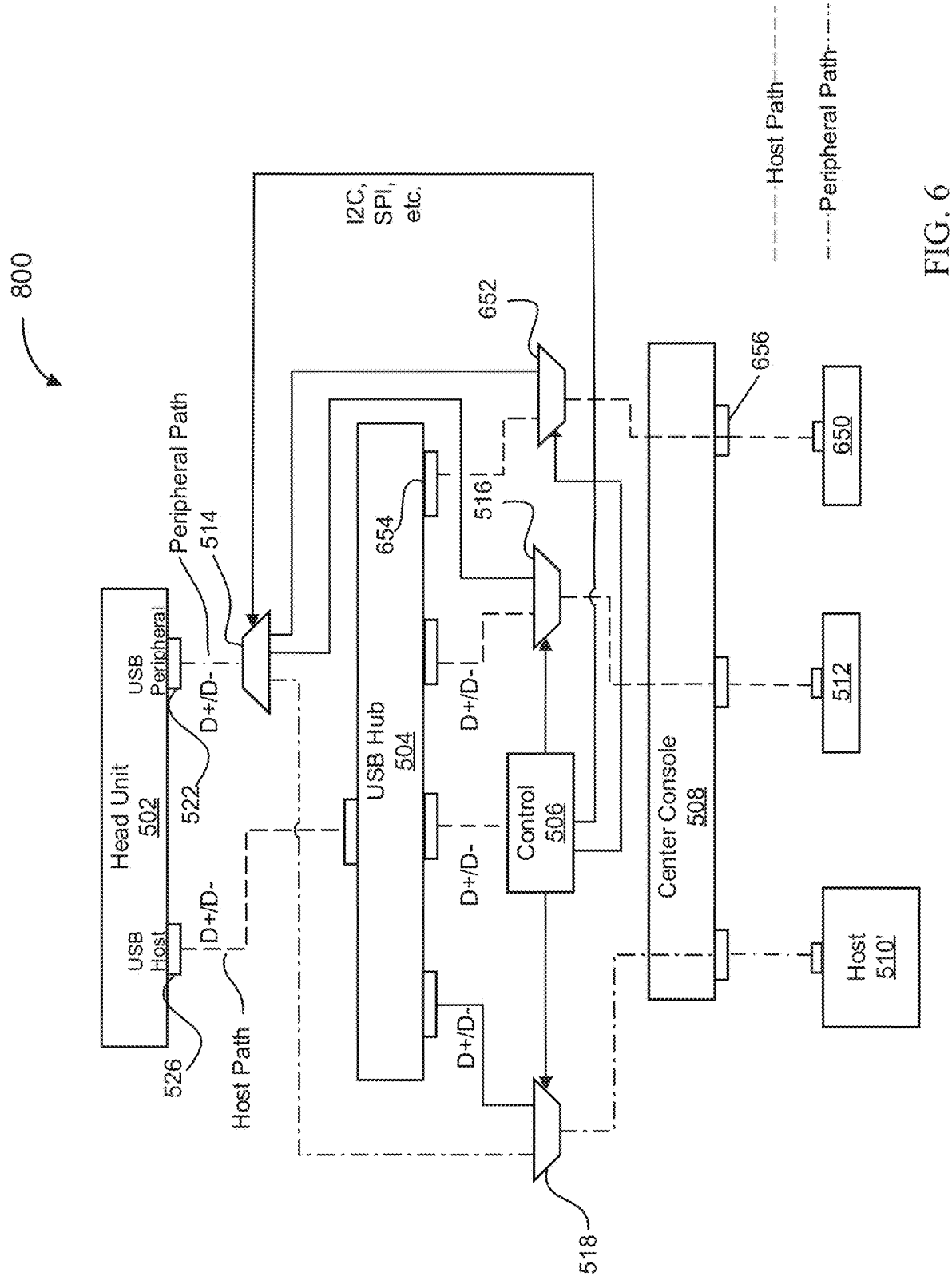
FIG. 6 is a schematic diagram illustrating a USB system having a USB hub and corresponding switch circuit in accordance with one embodiment of the subject matter.

Referring to FIG. 6, USB system 800 may be similar to USB system 550 in FIG. 5B and allows coupling to three USB devices and control circuit 506 concurrently. In one embodiment, an additional receptacle 656, which may be a USB Type-C or other USB types receptacle, is mounted on vehicle center console 508 and an additional downstream port 654 in USB hub 504. Besides, fourth signal repeater 652 may be coupled between USB device 650 and USB host port 526 via USB hub 504 or peripheral port 522 via third signal repeater 514. In one embodiment, if USB device 650 is a peripheral device, head unit 502 may send USB commands to control circuit 506, which may in turn configure fourth signal repeater 652 to select USB D+/D− signals from USB hub 504 in order to establish a host signal path between USB host port 526 and USB device 650. In another embodiment, if USB device 650 is a USB host device, an OTG device, or an iPhone® in CarPlay® mode, head unit 502 may select or allow the user to select whether USB host device 510' or USB device 650 should be the host, and establish peripheral signal path accordingly. In alternative embodiments, one or more additional receptacle or port may be added to vehicle center console 508 with similar circuit modification as receptacle 654, such that one or more USB device may be coupled to head unit 502. In alternative embodiments, USB system 800 may adopt control circuit and control signal configuration embodiments as previously discussed in FIGS. 5D and 5E, and their description.

Figure 7:
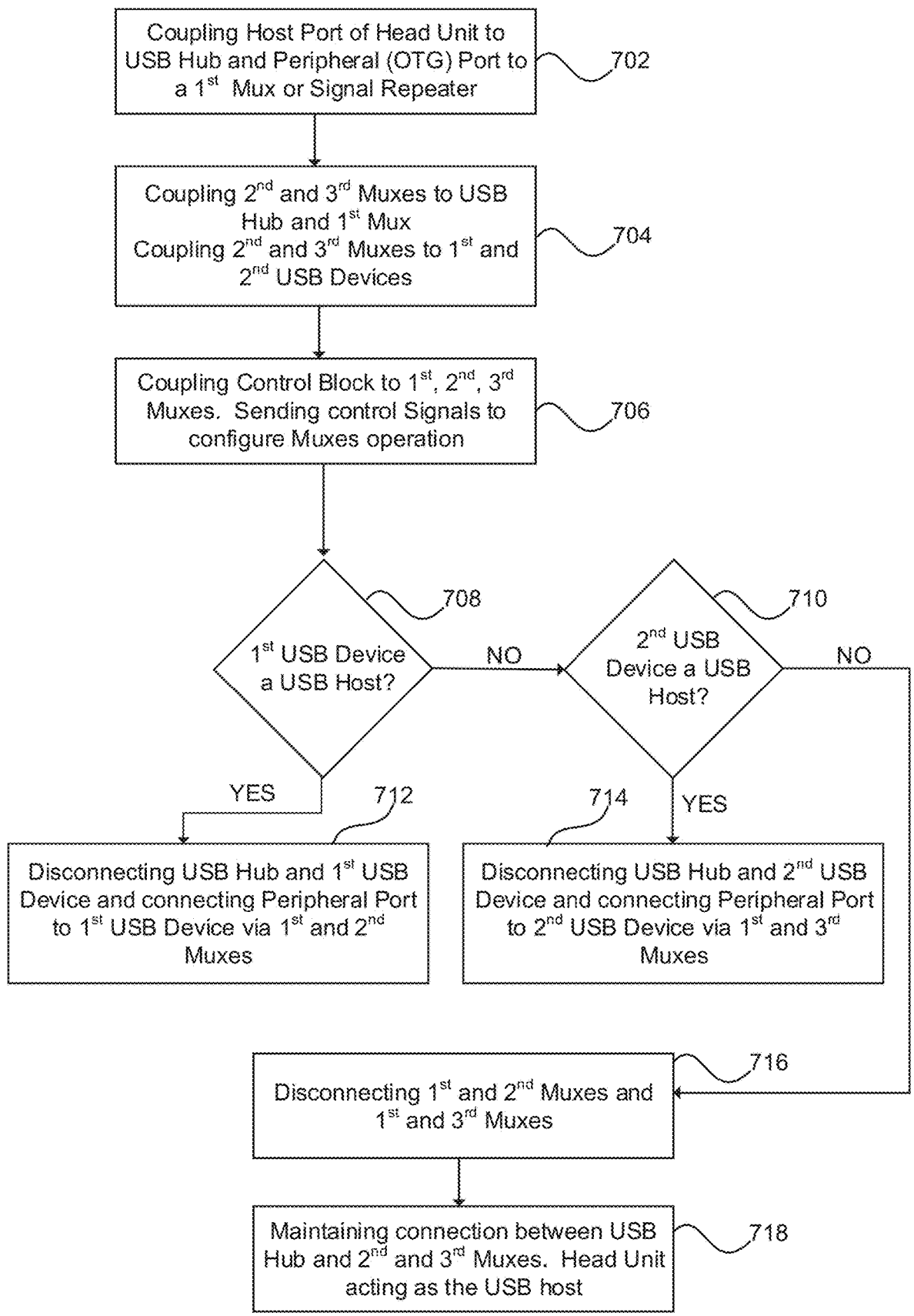
FIG. 7 is a representative flowchart illustrating a method to implement signal switching and port swapping in a USB system in accordance with one embodiment of the subject matter.

FIG. 7 is a representative flowchart illustrating a method to implement signal switching and port swapping in a USB system, such as USB system 500, in accordance with one embodiment of the subject matter. Referring to FIG. 7, a USB device, such as a head unit, may have a USB host port and a USB peripheral port, and the USB peripheral port may also be an OTG port. The USB host port may be coupled to an upstream port of a USB hub, and the USB peripheral port to a first switching unit, which may be a switch, a multiplexer or a signal repeater ("mux"), or a combination thereof, in step 702. Subsequently, a second mux may be coupled to one downstream port of the USB hub and a third mux to another downstream port. The second and third muxes are further coupled to the first mux at its multiple input/output end, in step 704. The second mux is further configured to be coupled to a first USB device and third mux to a second USB device, in step 704. In one embodiment, a control block, similar to control circuit 506 in FIG. 5A, may be configured to transmit control signals to first, second, and third muxes to control their respective signal switching operation, in step 706.

In one embodiment, the head unit may detect if the first USB device may act as a host, in step 708. Control signals may be transmitted to the second mux, such that it may disconnect the USB hub to the first USB device, if the first USB device acts as a USB host. The second and/or first muxes may also be configured by the control signals to enable communication link from the peripheral port to the first USB device, in step 712. If the first USB device is not USB host, the head unit may detect if the second USB device may act as a host, in step 710. In one alternative embodiment, the head unit may detect if the second USB device may act as a host even when the first USB device is assuming the host role.

In one embodiment, control signals may be transmitted to the third mux, such that it may disconnect the USB hub to the second USB device if the first USB device acts as a USB host. The third and/or first muxes may also be configured by the control signals to enable connection link from the USB peripheral port to the second USB device, in step 714. If the second USB device is not a USB host, communication links between the USB peripheral port of the head unit and both the second and third muxes may be disconnected, in step 716. In one embodiment, the head unit may act as a USB host to both the first and second USB devices via the USB hub when both the first and second USB devices act as a USB peripheral, in step 718.

Figure 8A:
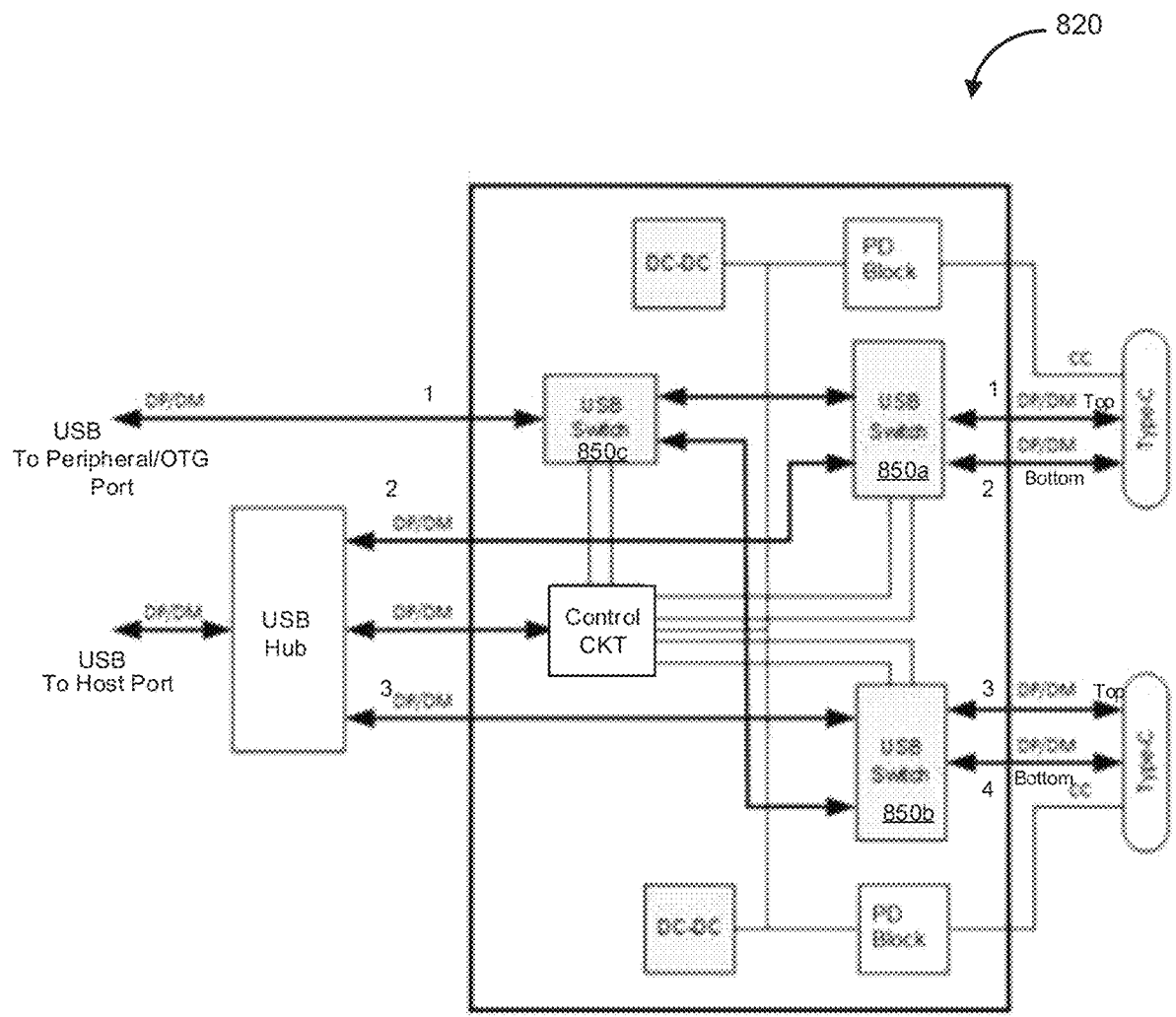
FIG. 8A is a schematic diagram illustrating a USB system having a USB hub and corresponding switch circuit in accordance with one embodiment of the subject matter.

Referring to FIG. 8A, USB system 820 that is similar to USB system 500 in FIG. 5A, and is USB Type-C compatible. In one embodiment, USB switches 850a to 850c may perform similar functions to signal repeaters 514, 516, and 518 and accommodate top and bottom D+/D− USB signals from each of the Type-C ports. In one embodiment, the switching circuitry formed by USB switches 850a to 850c may be a four input to 3 output (3×4) USB switch, such as a 3×4 USB 2.0 switch. The switching circuitry may route D+/D− lines of the top and bottom of each of the two USB Type-C ports (four inputs) to two downstream ports of the USB hub and the USB peripheral/OTG port of the head unit (three outputs). The operation of the switching circuitry may be similar to the embodiments disclosed in FIG. 7 and its corresponding description.

Figure 8B:
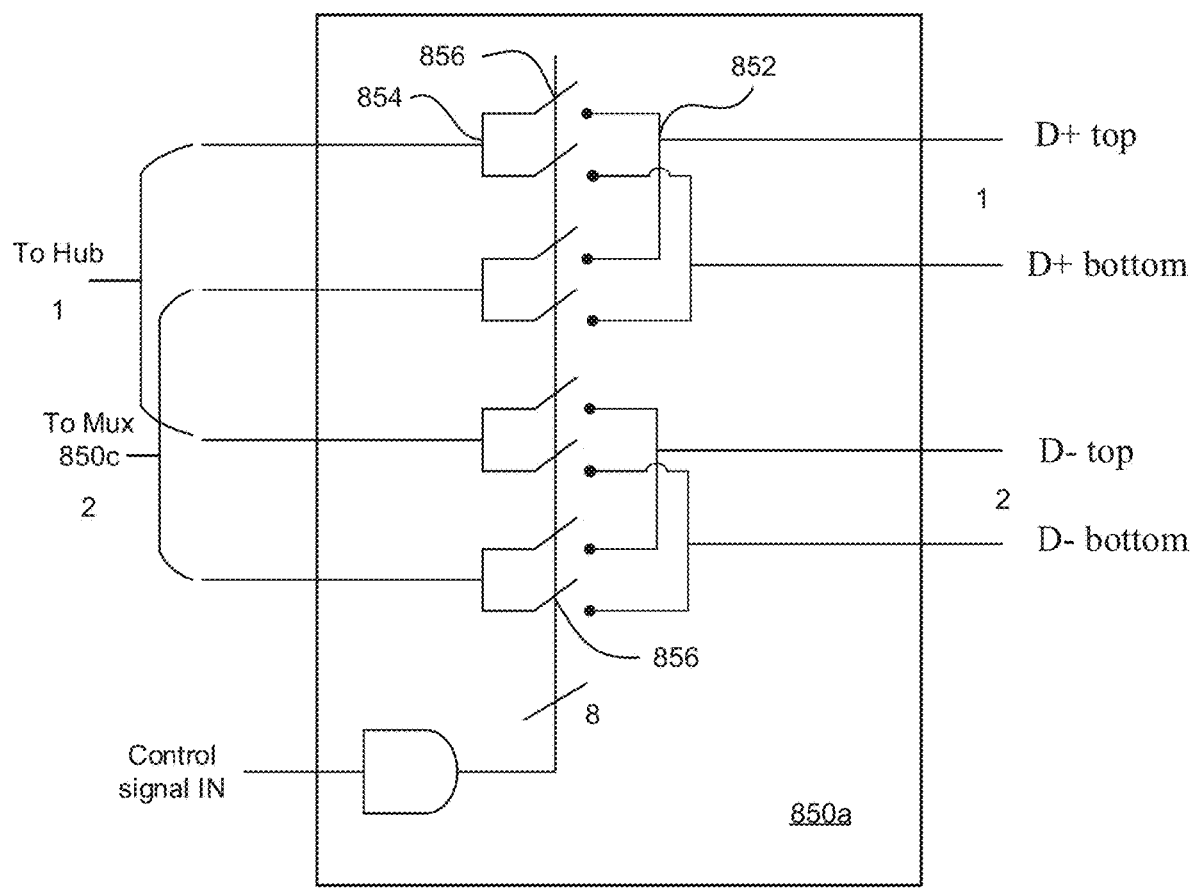
FIG. 8B is a schematic diagram illustrating a USB D+/D− switch or switching unit in accordance with one embodiment of the subject matter.

FIG. 8B is a schematic diagram illustrating USB switch 850a in accordance with one embodiment of the subject matter. In one embodiment, USB switches 850a to 850c may have similar structural features, and USB switch 850a is illustrated herein as an example. In one embodiment, USB switch 850a may be a two input to two input (2×2) USB switch, such as a 2×2 USB 2.0 switch. The two inputs may be D+ top/D− top and D+ bottom/D− bottom of one Type-C port/receptacle and the two outputs may be routed respectively to downstream port of USB hub and USB switch 850c. In one embodiment, USB switch 850a may have eight individual switches 856, in which the operation of each switch 856 is configured by the control signals from the control circuitry. Each signal path to the USB peripheral/OTG port, for example D+ top, may have to pass through two stubs 852, 854 and one switch 856. In one embodiment, an active peripheral signal path between the USB peripheral/OTG port and the Type-C port may have to pass through four stubs 852 or 854 and two switches 856 (in USB switches 850a and 850c or 850b and 850c). In one embodiment, USB signals may be degraded when switches, and to a lesser extent stubs are present in the signal path. Signal integrity may be preserved when fewer stubs and/or switches are present in the signal path.

Figure 9A:
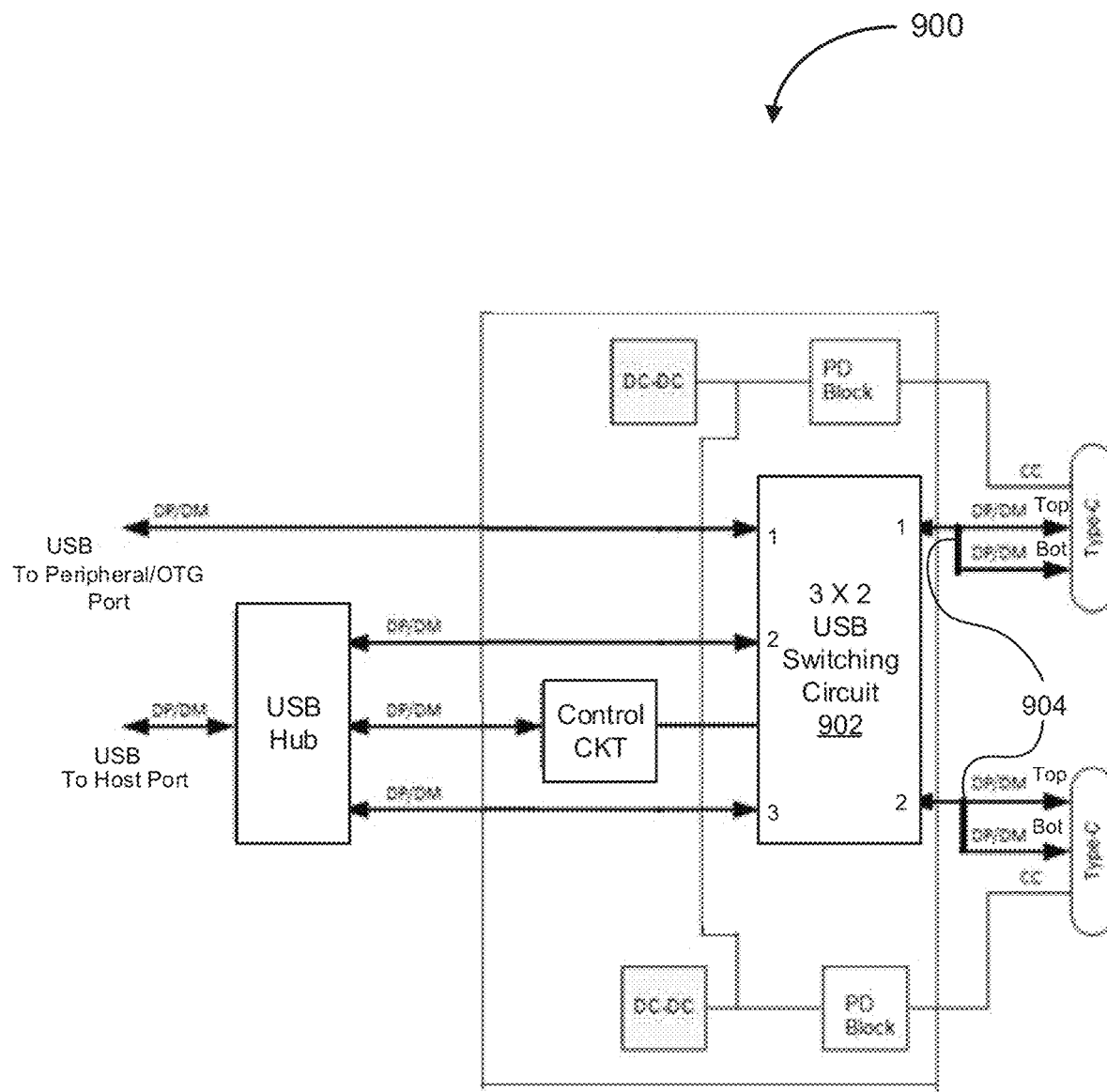
FIG. 9A is a schematic diagram illustrating a USB system having a USB hub and corresponding switch circuit in accordance with one embodiment of the subject matter.

Referring to 9A, a USB type-C compatible USB system 900 is illustrated. In one embodiment, the shown system is similar to USB system 820 in FIG. 8A, wherein two Type-C ports/receptacles are present. In one embodiment, instead of using three 2×2 USB switches 850a to 850c as illustrated at least in FIGS. 5A and 8A, a single two input to three output (3×2) USB switching circuit 902 may be used to route appropriate signal path(s) to USB host and peripheral/OTG ports of the head unit, corresponding to the assumed role of connected USB device(s) (not shown in FIG. 9A). In one embodiment, D+/D− top and bottom signals of each of the Type-C ports are shorted at stub 904 to form the two inputs to USB switching circuit 902. The USB switching circuit 902 may route D+/D− signals to one of the two downstream ports of the USB hub or the peripheral/OTG port of the head unit.

Figure 9B:
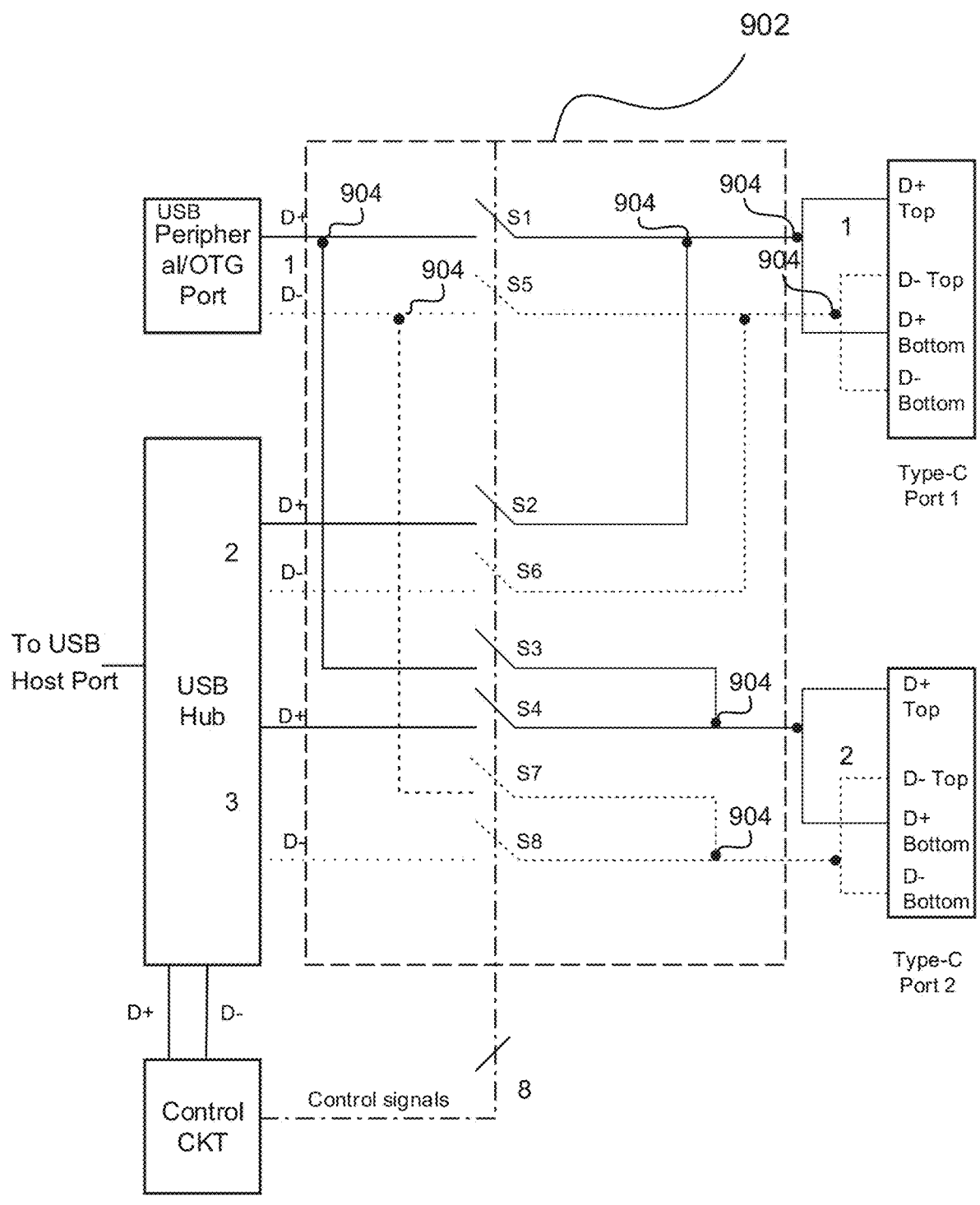
FIG. 9B is a schematic diagram illustrating a USB D+/D− switch or switching unit in accordance with one embodiment of the subject matter.

Referring to FIG. 9B, USB switching circuit 902 may include eight switches S1 to S8, and the operations of switches S1 to S8 may be controlled by the control circuit. In each Type-C port, D+ top and D+ bottom lines are shorted at stub 904 and similarly for D− top and D− bottom lines to form one D+/D− input to USB switching circuit 902. In one embodiment, the operation of USB switching circuit 902 is summarized as follow:

TABLE 1

| Type-C (Port 1) | Type-C (Port 2) | D+ Switches (ON) | D− Switches (ON) |
|---|---|---|---|
| USB Device (Slave) - Host signal path through USB hub | iPhone ® - Carplay enabled - Peripheral/OTG signal path | Port 1 - S2 Port 2 - S3 | Port 1 - S6 Port 2 - S7 |
| USB Device (Slave) | USB Device (Slave) | Port 1 - S2 Port 2 - S4 | Port 1 - S6 Port 2 - S8 |

TABLE 1-continued

| Type-C (Port 1) | Type-C (Port 2) | D+ Switches (ON) | D− Switches (ON) |
|---|---|---|---|
| iPhone® - Carplay enabled | USB Device (Slave) | Port 1 - S1<br>Port 2 - S4 | Port 1 - S5<br>Port 2 - S8 |
| iPhone® - Carplay enabled | iPhone® - Carplay enabled | One of the above configurations | One of the above configurations |

In one embodiment, when a USB peripheral device is coupled to Type-C Port 1 and an iPhone® to Type-C Port 2, D+ signal path from Type-C Port 1 may pass through switch S2 and D− signal path through switch S6. In one embodiment, the point-to-point signal path from Type-C Port 2 to the USB peripheral/OTG port of the head unit may pass through only a single switch (S3 for D+ and S7 for D−) and three stubs 904. The fewer switches and stubs along the signal path, compared to the 3×4 USB switch featured in FIG. 8A may help reduce USB signal degradation and maintain signal integrity. In one embodiment, when both ports are coupled to a USB host or OTG device, such as an iPhone®, USB system 900 may allow users to select one of the two devices to be the USB host to the head unit, or may automatically revert to one of the first three configurations.

Figure 10:
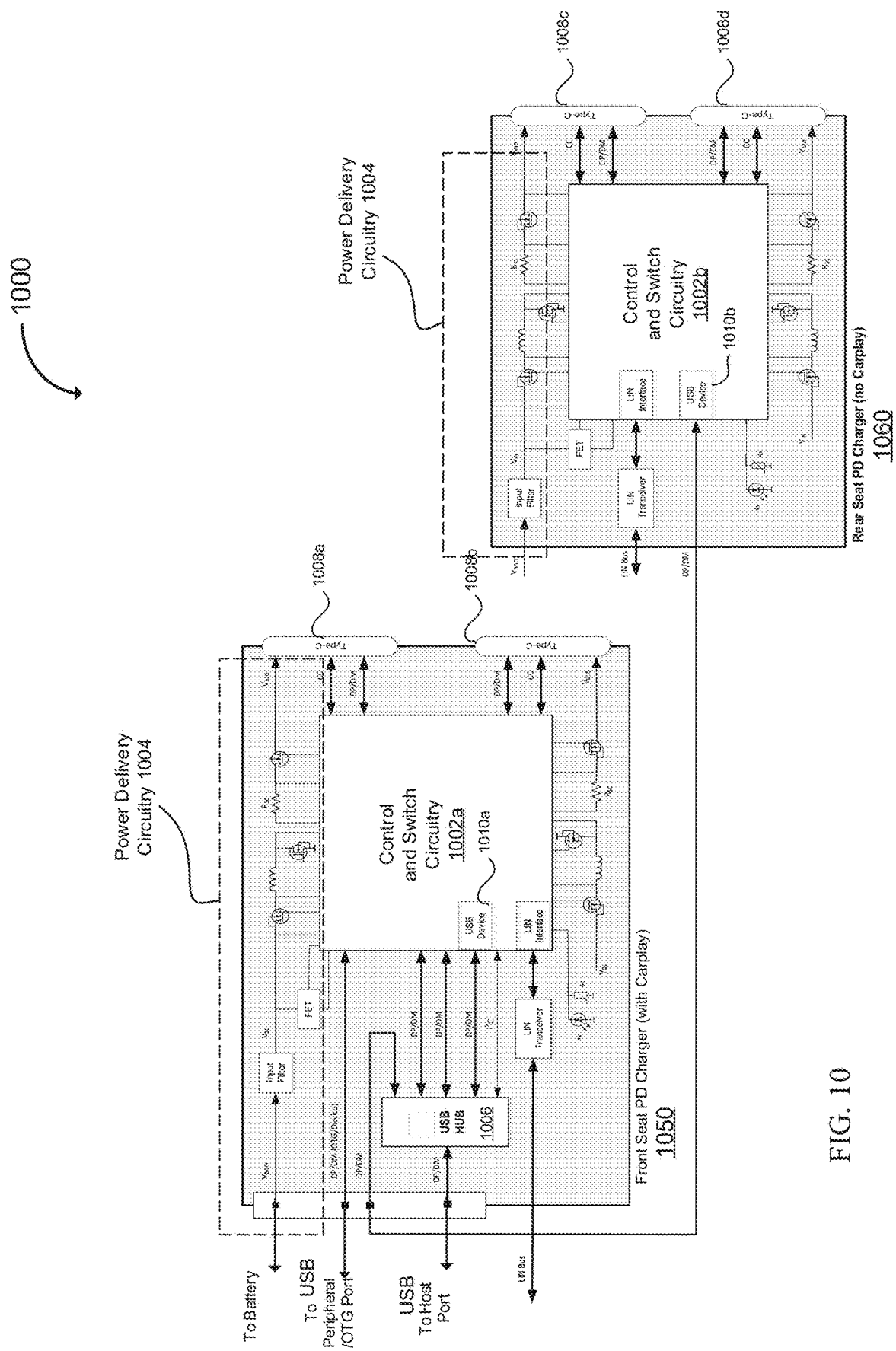
FIG. 10 is a schematic diagram illustrating one application of the USB control and switching circuitry in an automobile in accordance with one embodiment of the subject matter.

FIG. 10 is a schematic diagram illustrating one application of the USB control and switching circuitry in an automobile in accordance with one embodiment of the subject matter. Referring to FIG. 10, automobile USB system 1000 includes center console or front seat power delivery (PD) charger 1050, which may be a part of in-dash vehicle display, and rear seat PD charger 1060. In one embodiment, center console PD charger 1050 may include control and switch circuitry 1002a that may have similar features and functions as USB system 500 in FIG. 5A, 3×4 USB switch in FIG. 8A, or 3×2 switching circuit 902 in FIG. 9A. USB device 1010a may include the control circuitry that is coupled to one downstream port of USB hub 1006. Two other downstream ports of USB hub 1006 may be coupled to control and switch circuitry 1002a, and one other downstream port to USB device (control circuitry) of rear seat PD charger 1002b. Similar to FIG. 5A, peripheral/OTG port of head unit 1050 is coupled to control and switch circuitry 1002a and USB host port to upstream port of USB hub 1006. USB Type-C receptacles/ports 1008a and 1008b are configured to offer coupling to mobile USB devices (not shown). In addition, power delivery circuitry 1004 is also coupled to receptacles 1008a and 1008b to provide up to ~20 V in fixed PDO mode and ~21 V in PPS PDO mode charging to connected mobile USB devices, or other voltages such as those supported by USB-PD and/or USB-C specifications. In one alternative embodiments, there may be more than two receptacles in center console PD charger 1050 and the embodiment may be similar to the one featured in FIG. 6.

In one embodiment, control and switch circuitry 1002a may perform signal path control and switching between head unit (either through USB host port or USB peripheral/OTG port) to connected mobile USB device(s). For example, when an iPhone® or another mobile phone (not shown) is coupled to receptacle 1008a, it may behave initially as USB peripheral, and the signal path to is controlled by the head unit (not shown) via center console PD charger 1050. When the head unit detects the iPhone®, it may offer the user the option to enable CarPlay® application. Once the iPhone® is CarPlay® enabled, control and switch circuitry 1002a may establish a signal path/communication link between the USB peripheral/OTG port and the iPhone®, wherein the iPhone® is the USB host. In one alternative embodiment, the aforementioned port switching may happen automatically. In one embodiment, another mobile USB device (not shown) may be coupled to receptacle 1008b, being USB peripheral to head unit via the USB host port. As discussed, the operation of the host signal path (USB host port to receptacle 1008b) and peripheral signal path (USB peripheral/OTG port to the iPhone®) may exist concurrently, but operated individually. In one alternative embodiment, the iPhone® may be coupled to 1008b and the peripheral mobile USB device to receptacle 1008a instead.

In one embodiment, signal paths may be extended to rear seat PD charger 1060 through cascading. Control and switch circuitry 1002b may configure host signal paths to receptacle 1008c and 1008d for coupling to peripheral mobile USB devices. In addition, power delivery circuitry 1004 may also provide up to ~20 V in fixed PDO mode and ~21 V in PPS PDO mode charging to those devices, or other voltages such as those supported by USB-PD and/or USB-C specifications. In one embodiment, OTG operation, iPhone® with CarPlay® operation, and other USB host operation may not be supported at receptacles 1008c and 1008d.

Embodiments of the subject matter include various operations described herein. These operations may be performed by hardware components, software, firmware, or a combination thereof.

Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

In the foregoing specification, the subject matter has been described with reference to specific exemplary embodiments thereof. It will, however, be evident that various modifications and changes may be made thereto without departing from the broader spirit and scope of the subject matter as set forth in the appended claims. The specification and drawings are, accordingly, to be regarded in an illustrative sense rather than a restrictive sense.

What is claimed is:

1. A universal serial bus (USB) apparatus, comprising:
   a USB hub including a plurality of downstream ports and an upstream port to couple to a USB host port of a head unit device;
   a first switching unit coupled to a USB peripheral port of the head unit device;
   a second switching unit configured to be coupled to a first USB device and to a first downstream port of the USB hub and to the first switching unit; and
   control circuitry operable to provide first control signals to the first and second switching units, wherein the first control signals cause the first and second switching units to provide connectivity between the USB peripheral port of the head unit device and the first USB device that bypasses the USB hub when the first USB device is operating as a USB host, and to provide second control signals to at least the second switching unit, wherein the second control signals cause the second switching unit to provide connectivity between the USB host port of the head unit device and the first USB device via the first downstream port of the USB hub when the first USB device is operating as a USB peripheral.

2. The USB apparatus of claim 1, further comprising:
   a third switching unit configured to be coupled to a second USB device and to a second downstream port of the USB hub and to the first switching unit.

3. The USB apparatus of claim 2, wherein the control circuitry is further operable to:
   provide third control signals to the first and third switching units, wherein the third control signals cause the first and third switching units to provide connectivity between the USB peripheral port of the head unit device and the second USB device when the second USB device is operating as a USB host; and
   provide fourth control signals to at least the third switching unit, wherein the fourth control signals cause the third switching unit to provide connectivity between the USB host port of the head unit device and the second USB device via the second downstream port of the USB hub when the second USB device is operating as a USB peripheral.

4. The USB apparatus of claim 1, wherein the control circuitry comprises USB device functions and is coupled to a third downstream port of the USB hub, and wherein the control circuitry is configured to receive USB signal commands from the head unit device through the USB host port of the head unit device and the USB hub.

5. The USB apparatus of claim 1, wherein the control circuitry is coupled to the first USB device through a serial interface.

6. The USB apparatus of claim 1, wherein the first and second switching units are configured to multiplex USB D+/D− signals.

7. The USB apparatus of claim 2, wherein the third switching unit is configured to multiplex USB D+/D− signals.

8. The USB apparatus of claim 2, wherein each of the first, second, and third switching units comprises a two input to two output (2×2) USB 2.0 switch.

9. The USB apparatus of claim 1, wherein the control circuitry is a part of the head unit device.

10. The USB apparatus of claim 1, wherein the USB peripheral port of the head unit device is a USB On-The-Go (OTG) port and the first USB device is an OTG device.

11. The USB apparatus of claim 1, wherein the first USB device is coupled to the head unit device through a USB Type-C receptacle.

12. A method, comprising:
    coupling a universal serial bus (USB) peripheral port of a head unit device to a first USB device through a first switching unit and a second switching unit to establish a first signal path;
    coupling a USB host port of the head unit device to the first USB device through a USB hub and the second switching unit to establish a second signal path;
    transmitting first control signals, by control circuitry, to the first and second switching units, to activate the first signal path between the USB peripheral port of the head unit device and the first USB device and to bypass the USB hub when the first USB device is operating as a USB host; and
    transmitting second control signals, by the control circuitry, to at least the second switching unit to activate the second signal path and to connect the USB host port of the head unit device to the first USB device via a first downstream port of the USB hub when the first USB device is operating as a USB peripheral.

13. The method of claim 12, further comprising:
    coupling the USB peripheral port of the head unit device to a second USB device through the first and a third switching units to establish a third signal path;
    coupling the USB host port of the head unit device to the second USB device through the USB hub and the third switching unit to establish a fourth signal path;
    disconnecting the USB hub and the second USB device, using the third switching unit, to deactivate the fourth signal path when the second USB device is operating as a USB host; and
    activating the third signal path, using the first and third switching units when the second USB device is operating as a USB host.

14. The method of claim 13, wherein the second signal path and the third signal path are configured to be activated concurrently when the head unit device is operating as a USB host to the first USB device and as a USB peripheral to the second USB device.

15. The method of claim 13, wherein the first signal path and the fourth signal path are configured to be activated concurrently when the head unit device is operating as a USB peripheral to the first USB device and as a USB host to the second USB device.

16. A universal serial bus (USB) system, comprising:
    a head unit of an automobile infotainment system, including a USB host port and a USB peripheral port;
    a USB hub including an upstream port coupled to the USB host port of the head unit;
    switching circuitry configured to switch and multiplex USB D+/D− signals;
    control circuitry configured to transmit control signals to the switching circuitry; and
    a vehicle center console including first and second USB Type-C ports;
    wherein when a first USB device is operating as a USB host and is coupled to the first USB Type-C port, the control signals are configured to cause the switching circuitry to disconnect the USB hub from the first USB device and to enable connection between the USB peripheral port of the head unit and the first USB device.

17. The USB system of claim 16, wherein the first USB device is an Apple® iPhone® that is CarPlay® enabled, and wherein the USB peripheral port of the head unit is a USB On-The-Go (OTG) port.

18. The USB system of claim 16, wherein the switching circuitry includes first, second, and third signal repeaters, wherein the first signal repeater is coupled to the USB peripheral port and the second and third signal repeaters are each coupled to one of downstream ports of the USB hub and the first signal repeater, and wherein the first, second, and third signal repeaters each includes a two input to two output (2×2) USB 2.0 switch.

19. The USB system of claim 16, wherein the switching circuitry includes a two input to three output (3×2) USB 2.0 switch, wherein USB D+/D− top signals and USB D+/D− bottom signals coupled to the first USB type-C port are shorted to form a first D+/D− input, wherein USB D+/D− top signals and USB D+/D− bottom signals coupled to the second USB type-C port are shorted to form a second D+/D− input, and wherein two D+/D− outputs of the 3×2 USB 2.0 switch are coupled to the USB hub and one D+/D− output to the USB peripheral port of the head unit.

20. The USB system of claim 16, wherein when a second USB device is operating as a USB peripheral and is coupled to the second USB Type-C port, the control signals are configured to cause the switching circuitry to enable connection between the USB host port of the head unit and the second USB device through the USB hub.

21. The USB system of claim 16, wherein when a second USB device is operating as a USB host and is coupled to the second USB Type-C port, the control signals are configured to cause the switch circuitry to enable connection between the USB peripheral port of the head unit and the second USB device.

22. The USB system of claim 20, wherein the head unit operates as a USB peripheral to the first USB device and as a USB host to the second USB device concurrently and individually.

* * * * *